(12) United States Patent
Jiang et al.

(10) Patent No.: US 12,117,396 B2
(45) Date of Patent: Oct. 15, 2024

(54) BIOCHEMICAL SUBSTANCE ANALYSIS SYSTEM, METHOD, AND DEVICE

(71) Applicant: MGI Tech Co., Ltd., Shenzhen (CN)

(72) Inventors: Heming Jiang, Shenzhen (CN); Chutian Xing, Shenzhen (CN); Joon Mo Yang, Sanjose, CA (US); Xiangkun Sui, Shenzhen (CN); Jian Liu, Shenzhen (CN); Razvan Chirita, San Jose, CA (US); Zhonghai Wang, Shenzhen (CN); Simon Robert Adams, San Jose, CA (US); Le Wang, Shenzhen (CN); Mark Frederick Senko, San Jose, CA (US); Craig Edward Uhrich, San Jose, CA (US); Sicheng Wen, Shenzhen (CN); Pin Kao, San Jose, CA (US); Feng Mu, Shenzhen (CN)

(73) Assignee: MGI Tech Co., Ltd., Shenzhen (CN)

( * ) Notice: Subject to any disclaimer, the term of this patent is extended or adjusted under 35 U.S.C. 154(b) by 295 days.

(21) Appl. No.: 17/763,295

(22) PCT Filed: Sep. 24, 2019

(86) PCT No.: PCT/CN2019/107593
§ 371 (c)(1),
(2) Date: Mar. 24, 2022

(87) PCT Pub. No.: WO2021/056208
PCT Pub. Date: Apr. 1, 2021

(65) Prior Publication Data
US 2022/0341848 A1 Oct. 27, 2022

(51) Int. Cl.
*G01N 21/63* (2006.01)
*G01N 21/03* (2006.01)
(Continued)

(52) U.S. Cl.
CPC ......... *G01N 21/63* (2013.01); *G01N 21/0332* (2013.01); *G01N 21/13* (2013.01); *G01N 21/85* (2013.01)

(58) Field of Classification Search
CPC .... G01N 21/85; G01N 21/13; G01N 21/0332; G01N 21/63; G01N 21/645; G01N 21/05; G01N 2021/6482; G01N 2021/0325
See application file for complete search history.

(56) References Cited

U.S. PATENT DOCUMENTS 5,674,743 A * 10/1997 Ulmer ............... B01L 3/502776
  436/172
6,221,671 B1 * 4/2001 Groner ............... G01N 15/1456
  436/63

(Continued)

FOREIGN PATENT DOCUMENTS

CN  104569462 A  4/2015
CN  110161003 A  8/2019
(Continued)

OTHER PUBLICATIONS

Zhu "Optical Detecting Device and Real-time Fluorescent Quantitative Nucleic Acid amplification Detection System", Aug. 23, 2019, CN 110161003A (Year: 2019).*
Han et al "A Gene Sequencer", Sep. 9, 2015, CN 204625608U (Year: 2015).*

*Primary Examiner* — Sang H Nguyen
(74) *Attorney, Agent, or Firm* — ScienBiziP, P.C.

(57) ABSTRACT

A biochemical substance analysis system (5) is used to detect biological characteristics of a sample in a flow cell (38), and includes a detection system (51), a scheduling system (53), a biochemical reaction system (55), and a control system (57). The scheduling system (53) is used to schedule the flow cell (38) at different sites, including sites in the detection system (51) and sites in the biochemical reaction system (55). The biochemical reaction system (55)

(Continued)

is used to allow the sample to react in the flow cell (38). The detection system (51) is used to detect a signal from the reacted sample to obtain a signal representing the biological characteristics of the sample. The control system (57) is used to control the detection system (51), the scheduling system (53), and the biochemical reaction system (55) to cooperate. The disclosure improves automation degree and flux of the biochemical substance analysis.

16 Claims, 10 Drawing Sheets

(51) Int. Cl.
  *G01N 21/13* (2006.01)
  *G01N 21/85* (2006.01)

(56) References Cited

U.S. PATENT DOCUMENTS

| | | | |
|---|---|---|---|
| 2005/0051706 A1* | 3/2005 | Witney | G01N 21/6452 250/214 R |
| 2008/0124726 A1* | 5/2008 | Monforte | G01N 33/56966 435/7.1 |
| 2017/0146434 A1* | 5/2017 | Bransky | B01L 3/502738 |

FOREIGN PATENT DOCUMENTS

| | | |
|---|---|---|
| JP | 2006-038881 A | 2/2006 |
| JP | 2009-532031 A | 9/2009 |
| JP | 2014-153242 A | 8/2014 |
| JP | 2015-514218 A | 5/2015 |
| JP | 2016-532111 A | 10/2016 |
| WO | 2016/196942 A1 | 12/2016 |

\* cited by examiner

BIOCHEMICAL SUBSTANCE ANALYSIS SYSTEM, METHOD, AND DEVICE

FIELD

The subject matter relates to field of biochemical substance analysis, and more particularly, to a biochemical substance analysis system, a biochemical substance analysis method, and a biochemical substance analysis device.

BACKGROUND

A common sample detection device at least includes a flow cell, a detection system, a fluid system, etc. The flow cell is an area where a sample to be tested and a detection fluid (such as a reagent) undergo a detection reaction. The detection system is used to apply an excitation signal and record a feedback signal of the detection reaction. The fluid system is used to input the detection fluid for detection reaction and discharge waste after the detection reaction. Taking the common gene sequencer designed and manufactured based on the second-generation sequencing technology as an example, the whole device is mainly composed of the flow cell, the signal detection system, and the fluid system.

The flow cell (i.e., a sample carrier) is used to load the sample including a biochemical substance, and the detection reaction is performed in the flow cell. The flow cell usually includes a cavity for receiving the sample and the fluid. In the field of gene sequencing, the flow cell is an area used to load the sample for gene sequencing, and a sequencing reaction is performed in the flow cell. The flow cell usually includes the cavity for receiving the sample and the fluid. The flow cell is also called a reaction cell, a chip, a sequencing chip, a gene sequencing chip, or a card box, and its common English names include flow cell, flowcell, chip, chip kit, and cartridge. Since sample loading has non-repeatability, to avoid contamination between different samples, the sequencing chip is usually designed for one-time use, which can be repeatedly assembled and disassembled and has a fully closed structure. The sequencing chip can have one or more independent channels, and each channel has an inlet and an outlet respectively for input and output of the fluid during the detection reaction. An upper surface of the sequencing chip is usually made of a transparent material, which allows an excitation optical signal and a feedback optical signal excited by the excitation optical signal to pass through. Thus, the optical signals passing through the upper surface can be detected. A lower surface of the sequencing chip is usually a substrate, and the sample to be tested can be fixed on the lower surface by biological or chemical reaction.

The signal detection system can emit the excitation signal and receive the feedback signal. The common detection method of the second-generation sequencing technology needs inducing fluorescence by a laser beam. That is, a laser source is used to emit the laser beam, which excites fluorescence feedback from the sample. Then, an area-array camera is used to capture images of and record the excited optical signal. Therefore, the detection system is essentially an optical imaging system, which is mainly composed of components such as the laser source, an objective lens, a filter, a barrel lens, a camera, and a worktable. The laser source is used to excite the fluorescence feedback from the sample to be tested during the sequencing reaction. A module composed of the components such as the objective lens, the filter, the barrel lens, and the camera is used to collect a fluorescence signal from the sample to be tested. A shooting range of the area-array camera is usually much smaller than designed detection areas of the sequencing chip. Therefore, when the detection system works, the sequencing chip needs to move together with the worktable for traversal purpose of all detection areas. The camera is then used for real-time exposure, so as to successively receive the fluorescence signal from each of the detection areas of the sequencing chip.

The fluid system is used to input a sequencing fluid ready for the reaction into the sequencing chip and discharge the sequencing fluid after the reaction out of the sequencing chip. In the gene sequencer, a fluid that will participate in the detection reaction is the sequencing fluid. The fluid system is generally composed of components such as a sequencing fluid box, a sampling needle, a pipeline, and a fluid pump. The sequencing fluid box is a container for loading the sequencing fluid. The pipeline is a closed channel connecting different components of the fluid system together and allowing the sequencing fluid to pass through. The fluid pump is a power source for driving the sequencing fluid to flow through the fluid system. The components of the common fluid system are usually designed as being connected in series. In order to avoid contamination caused by the fluid pump, the sequencing fluid box is generally placed at an upstream position. The fluid needle is used as an inlet of the fluid system. The downstream of the sequencing fluid box is successively connected to the sequencing chip and the fluid pump through the pipeline. The pipeline connecting the sequencing chip and the fluid pump is usually called a main pipeline, which is the necessary way to load the sequencing fluid into and discharge the sequencing fluid from the fluid system. When the fluid system works, the fluid needle is inserted into the sequencing fluid box, and the fluid pump is turned on. Then, the sequencing fluid flows along the fluid needle and then into the sequencing chip through the pipeline. At the same time, the sequencing fluid currently existing in the sequencing chip is discharged along the pipeline of the fluid pump. The principle of the above design is to use the fluid pump to generate a negative pressure, so that the pressure in the whole fluid system is lower than an external atmospheric pressure. As such, the external atmospheric pressure drives the sequencing fluid to flow into the fluid system.

However, the existing detection instruments still have the problems of low degree of automation and low flux.

SUMMARY

To overcome at least a portion of the above shortcomings, a biochemical substance analysis system, method, and device are needed.

A first aspect provides a biochemical substance analysis system configured for detecting biological characteristics of a sample in a flow cell. The biochemical substance analysis system includes a detection system, a scheduling system, a biochemical reaction system, and a control system. The scheduling system is configured to schedule the flow cell at different sites, the sites comprise sites in the detection system and sites in the biochemical reaction system; the biochemical reaction system is configured to allow the sample to perform a reaction in the flow cell; the detection system is configured to detect a signal from the reacted sample to obtain the biological characteristics of the sample; the control system is configured to control the detection system, the scheduling system, and the biochemical reaction system to cooperate with each other.

A second aspect provides a biochemical substance analysis method, including:
 receiving a flow cell and transferring the received flow cell to a biochemical reaction system;
 causing a sample contained in the flow cell to perform a reaction by the biochemical reaction system;
 transferring the flow cell containing the reacted sample to a detection system; and detecting a signal from the reacted sample in the flow cell by the detection system to obtain biological characteristics of the sample.

A third aspect provides a biochemical substance analysis device including the above biochemical substance analysis system, or the biochemical substance analysis device is configured to perform the above biochemical substance analysis method to obtain biological characteristics of the sample, analyzable data, or detection report.

In the biochemical substance analysis system, method and device provided by the embodiment of the present disclosure, the user only needs to load the detection fluid, the cleaning fluid, and the flow cell containing the sample into the gene sequencer through an interface on the gene sequencer, and set relevant parameters through the user interaction system. Then, the gene sequencer and the gene sequencing system can automatically complete the gene sequencing, which improves the automation of gene sequencing.

BRIEF DESCRIPTION OF THE DRAWINGS

Implementations of the present technology will now be described, by way of embodiment, with reference to the attached figures. Obviously, the drawings are only some embodiments of the present disclosure. For those of ordinary skill in the art, other drawings can be obtained based on these drawings without creative work.

Figure 1:
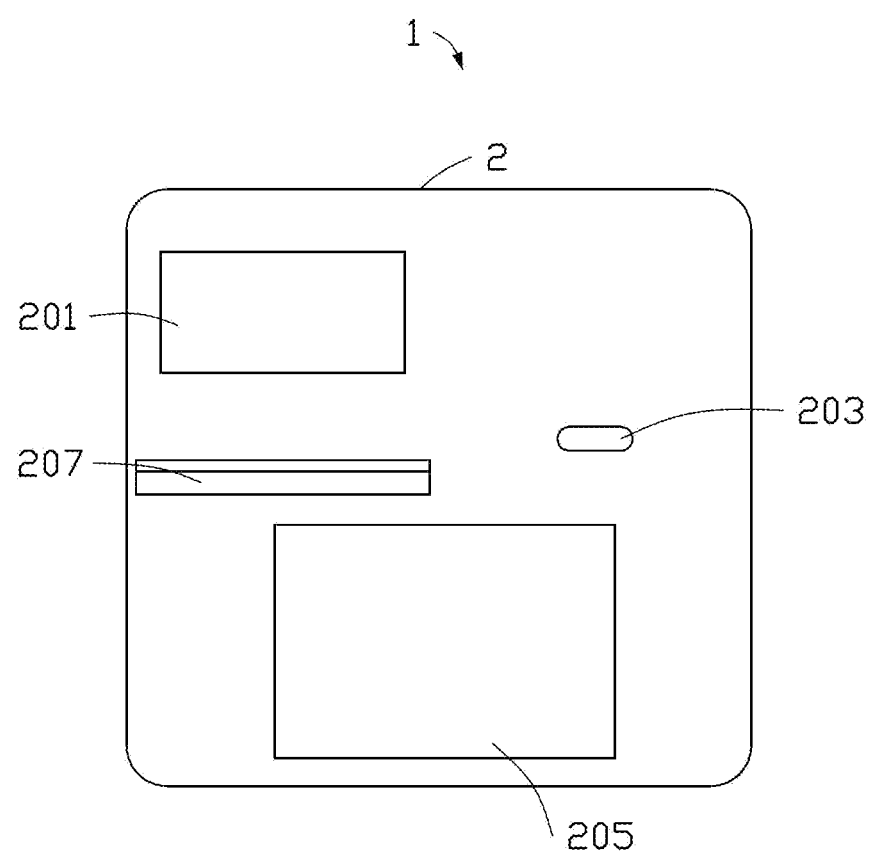
FIG. 1 is a diagrammatic view of a gene sequencer according to a first embodiment of the present disclosure.

Implementations of the disclosure will now be described, by way of embodiments only, with reference to the drawings.

SYMBOL DESCRIPTION OF MAIN COMPONENTS

Gene sequencer 1; housing 2; gene sequencing system 3; display interface 201; flow cell inletting interface 203; fluid box replacement interface 205; signal detection system 31; signal processing system 32; fluid system 33; waste treatment system 34; transfer system 35; control system 36, 57; user interaction system 37; flow cell 38; excitation signal transmission module 301; signal channeling module 303; feedback signal receiving module 305; received signal correction module 306; detection fixing component 308; moving component 310; signal transmission module 312; signal processing module 314; data storage module 316; detection reaction module 318; reaction temperature-controlled component 320; fluid transport module 322; temperature-uncontrolled storage component 324; temperature-controlled storage component 326; storage temperature-controlled component 328; waste storage device 4; waste collection module 330; waste transport module 332; detection control module 334; temperature control module 336; fluid control module 338; waste control module 340; transfer control module 342; system control module 344; visual interaction module 346; input module 348; excitation signal transmission component 3011; excitation signal sorting component 3012; general excitation signal distribution component 3013; feedback signal receiving component 3051; feedback signal sorting component 3052; general feedback signal distribution component 3053; general signal distribution component 3031; general signal transceiver component 3032; correction signal transmission component 3061; correction signal distribution component 3062; signal correction component 3063; power component 3220; protection component 3221; detection component 3222; sample storage component 3223; distribution component 3224; overall distribution component 3225; fluid transport working group 3226; inlet switch component 3181; outlet switch component 3182; bypass switch component 3183; overall switch component 3184; flow cell inlet 381; flow cell outlet 382; peripheral area Y, Z; waste collection power component 3301; waste storage component 3302; waste detection component 3303; waste-discharged power component 3321; waste switching component 3322; flow cell starting position O; flow cell temporary storage position T; flow cell abandonment position D; signal transmission component 3121; signal buffering component 3122; data analysis component 3141; data compression component 3161; data storage component 3162; biochemical substance analysis system 5, 61; detection system 51; scheduling system 53; biochemical reaction system 55; step S1001, S1003, S1005, S1007; biochemical substance analysis device 6, 7.

DETAILED DESCRIPTION

Implementations of the disclosure will now be described, by way of embodiments only, with reference to the drawings. The described embodiments are only some embodiments of the present disclosure, rather than all the embodiments. The disclosure is illustrative only, and changes may be made in the detail within the principles of the present disclosure. It will, therefore, be appreciated that the embodiments may be modified within the scope of the claims.

It should be noted that when a component is referred to as being "fixed to" or "mounted on" another component, the component can be directly on another component or a middle component may exist therebetween. When a component is considered to be "arranged on" another component, the component can be directly on another component or a middle component may exist therebetween. The term "and/or" as used herein means any combinations of one or more related listed items.

Quantitative pronouns such as M, N, and X in the disclosure refer to indefinite quantity or order, which is not used as a reference to a specific quantity or order. That is, the same pronouns M, N, or X at different places may refer to different quantities or orders.

FIG. 1 is a diagrammatic view of a gene sequencer according to an embodiment of the present disclosure. The gene sequencer 1 includes a housing 2 and a gene sequencing system 3 received in the housing 2 and interacting with an ambient environment outside the housing 2.

In the embodiment, a plurality of I/O interfaces are arranged on the housing 2. The I/O interfaces include an information I/O interface, such as a display interface 201 and a keyboard/mouse 207. In the embodiment, the keyboard/mouse 207 are hidden in the housing 2, and can be extracted out of the housing 2 when needed. The I/O interfaces also include a substance I/O interface, such as a flow cell inletting interface 203 and a fluid box replacement interface 205. A user can set necessary parameters/instructions through the information I/O interface. After a flow cell containing a sample (i.e., a sample carrier) or a fluid box containing a sequencing fluid (e.g., a reagent) or a cleaning fluid (e.g., a cleaning liquid) is loaded into the gene sequencer 1 through the corresponding substance I/O interface, the gene sequencer 1 is powered on. Then, the gene sequencer 1 automatically detects the sample in the flow cell according to the set parameters/instructions, and outputs corresponding results to the user through the information I/O interface.

The "flow cell" in the present disclosure is an area for loading the sample including a biochemical substance, and a detection reaction is performed in the flow cell. The flow cell usually includes a cavity for receiving the sample and the fluid, which can be understood as a sample carrier in a broad sense. That is, the flow cell is understood as a sequencing chip in the case of gene sequencing. In addition, the flow cell can also be understood as a sample carrier in other cases.

Figure 2:
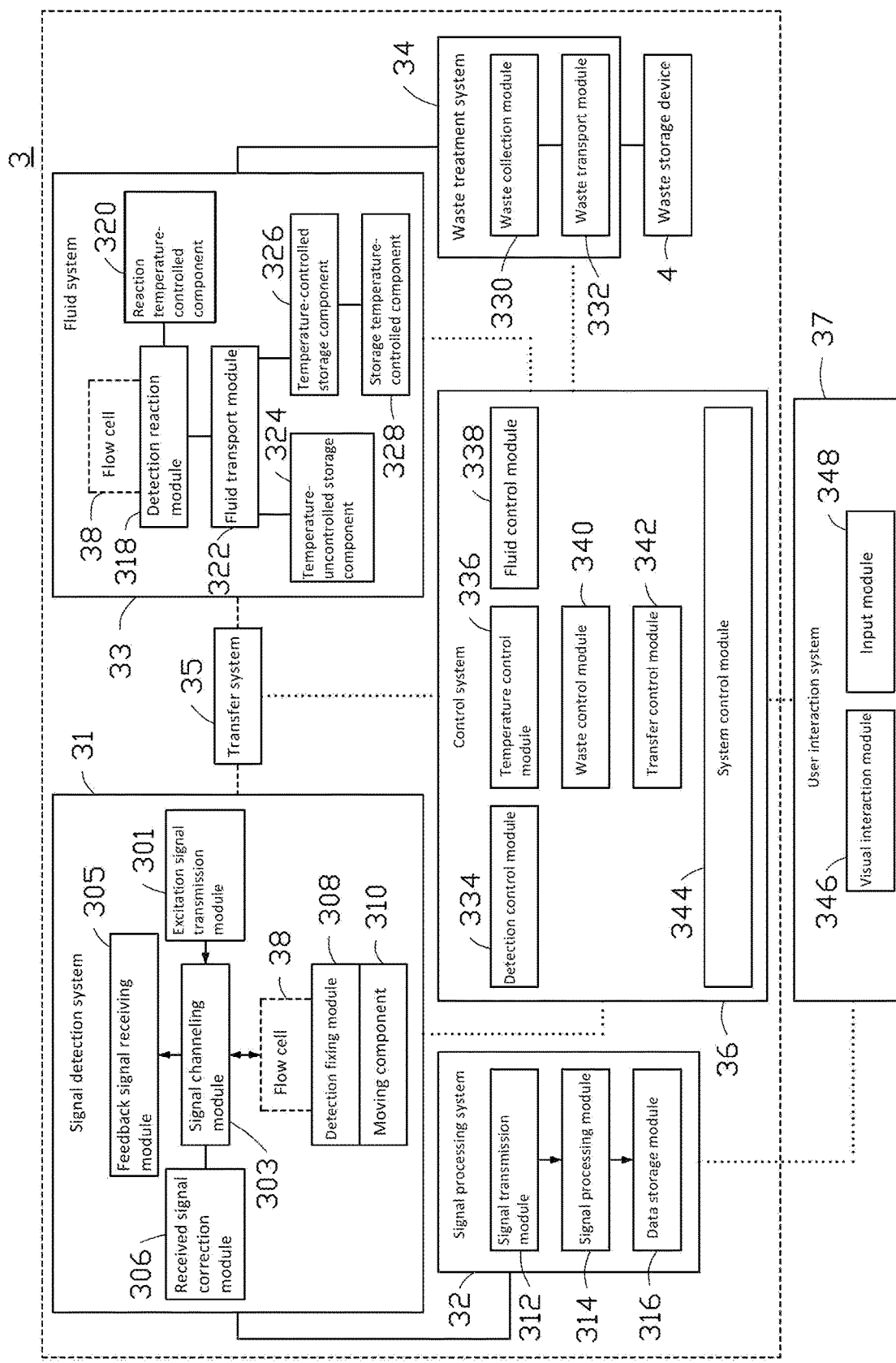
FIG. 2 is a diagrammatic view of a gene sequencing system of the gene sequencer of the present disclosure.

Referring to FIG. 2, in the embodiment, the gene sequencing system 3 includes subsystems such as a signal detection system 31, a signal processing system 32, a fluid system 33, a waste treatment system 34, a transfer system 35, a control system 36, and a user interaction system 37. After one or more flow cells 38 are placed in the gene sequencer 1, each flow cell 38 is transferred by the transfer system 35 among the subsystems, so that a sample in the flow cell 38 can complete a detection reaction, and a signal from the reacted sample is then detected.

Each of the subsystems is described in detail as follows.

The signal detection system 31 is used to detect the signal from the sample in the flow cell 38, which is carried out by applying an excitation signal, receiving and recording a feedback signal from the sample, etc. In the embodiment, the signal detection system 31 further includes an excitation signal transmission module 301, a signal channeling module 303, a feedback signal receiving module 305, a received signal correction module 306, a detection fixing component 308, and a moving component 310. In the embodiment, only one signal detection system 31 is shown for detecting the sample in the flow cell 38. In fact, the number of the signal detection system(s) 31 can also be multiple as needed. For example, M (M is a natural number greater than 1) signal detection systems 31 can be set in the gene sequencer 1 as needed. Each signal detection system 31 performs at least once signal detection on the sample in one flow cell 38 when controlled by the control system 36, thereby completing the signal detection of at least one base of the sample in the flow cell 38. When multiple signal detection systems 31 are included in the gene sequencer 1, the gene sequencer 1 can simultaneously detect the signals of the samples in the flow cells 38.

Submodules of the signal detection system 31 are described in detail as follows.

The excitation signal transmission module 301 is used to apply the excitation signal to the sample in the flow cell 38 and detect the feedback signal. The composition of the sample can be determined based on the feedback signal. The excitation signal can be an optical signal or an electrical signal. If the excitation signal is an optical signal, the excitation signal transmission module 301 may be a light source, such as a laser source and an LED. If the excitation signal is an electrical signal, the excitation signal transmission module 301 may be a power supply.

The signal channeling module 303 is used to guide the excitation signal from the excitation signal transmission module 301 to the flow cell 38 according to a preset path, and further guide the feedback signal from the flow cell 38 to the feedback signal receiving module 305 according to the preset path. If the excitation signal is an optical signal, the signal channeling module 303 may be an optical module composed of one or more optical components such as an objective lens, a barrel lens, a lens, and a filter. If the excitation signal is an electrical signal, the signal channeling module 303 may be an electrical module composed of one or more electrical components such as a conductive cable, a resistor, a capacitor, a rectifier, and a filter.

The feedback signal receiving module 305 is used to receive the feedback signal from the sample that is excited by the excitation signal. If the excitation signal is an optical signal, the feedback signal receiving module 305 may be an area-array camera, a line scanning camera, or another optical signal receiver such as a photodiode and a photomultiplier tube. If the excitation signal is an electrical signal, the feedback signal receiving module 305 may be an electrical signal receiving component such as a signal acquisition card.

The received signal correction module 306 is used to correct a transmission path of the excitation signal and a receiving path of the feedback signal, so that the transmitted excitation signal can match the received feedback signal, and an optimal effect is obtained. In the embodiment, if the excitation signal is an optical signal, the received signal correction module 306 can be any one of auto focusing components or a combination thereof. If the excitation signal is an electrical signal, the received signal correction module 306 may be any one of rectifier components or a combination thereof.

The detection fixing component 308 is used to detachably mount and fix the flow cell 38 thereon, so that the flow cell 38 can keep static relative to the detection fixing component 308 during the signal detection.

The moving component 310 is connected to the detection fixing component 308, and used to drive the detection fixing component 308 to move within a certain range, so that the signal detection can be performed on all areas needed to be detected in the flow cell 38. In the embodiment, the moving component 310 may be a mobile control device such as an XY mobile platform.

The signal processing system 32 is used to process and analyze the feedback signal received by the signal detection system 31, obtain sequencing data accordingly, and generate a report. In the embodiment, the signal processing system 32 includes a signal transmission module 312, a signal processing module 314, and a data storage module 316. Submodules of the signal processing system 32 are described in detail as follows.

The signal transmission module 312 is used to receive the feedback signal transmitted by the signal detection system 31, and temporarily store the feedback signal that waits for subsequent processing and analysis. As mentioned above, the gene sequencer 1 can include multiple signal detection systems 31 as needed. When multiple signal detection systems 31 are included, the feedback signal received by each signal detection system 31 can be sent to the signal transmission module 312, which temporarily stores the feedback signal that waits for the subsequent processing and analysis. The signal transmission module 312 may be any nonvolatile signal buffer device.

The signal processing module 314 is used to obtain the feedback signal temporarily stored in the signal transmission module 312, convert the feedback signal through algorithms into data for analysis, analyze the data to generate a sequencing report, and output the sequencing report to the user interaction system 37.

The data storage module 316 is used to compress the processed data and sequencing report and store them in a storage medium as a backup, so that the user can call and view them at any time.

The fluid system 33 is used to store a detection fluid (such as a detection reagent) that will be used in a detection reaction, load the detection fluid into the flow cell 38 to perform the detection reaction, and discharge all waste to the waste treatment system 34 after completing the detection reaction. In the embodiment, the fluid system 33 includes multiple submodules or components such as a detection reaction module 318, a reaction temperature-controlled component 320, a fluid transport module 322, a temperature-uncontrolled storage component 324, a temperature-controlled storage component 326, and a storage temperature-controlled component 328. It should be noted that only one fluid system 33 is shown in the embodiment. In fact, the number of the fluid system(s) 33 can be multiple as needed. For example, N (N is a natural number greater than 1) fluid systems 33 can be set in the gene sequencer 1 as needed. Each fluid system 33 is used to load one flow cell 38, and a specific fluid will be loaded into the flow cell 38 according to the sequencing requirements. Thus, the sample performs the detection reaction in the flow cell 38, and a specific substance or structure that can be detected by the signal detection system 31 is formed at each detection site of the flow cell 38. When multiple fluid systems 33 are included in the gene sequencer 1, the gene sequencer 1 can simultaneously load multiple flow cells 38, and a specific fluid will be loaded into each flow cell 38 according to the sequencing requirements, so that the sample in each flow cell 38 can complete the detection reaction. Submodules and components of the fluid system 33 are described in detail as follows.

The detection reaction module 318 is used to detachably mount the flow cell 38 for detection reaction thereon, so that the flow cell 38 can be repeatedly fixed to the detection reaction module 318 through a physical connection. In the embodiment, after mounted on the detection reaction module 318, the flow cell 38 remains static with respect to the detection reaction module 318. Also, the flow cell 38 is in full contact with the detection reaction module 318 to ensure heat exchange efficiency therebetween, and an inlet of the flow cell 38 for loading in the fluid and an outlet of the flow cell 38 for discharging the fluid are hermetically connected to other modules of the fluid system 33. The detection reaction module 318 is an interaction module between the fluid system 33 and the flow cell 38. The channels inside the detection reaction module 318 can determine a flow mode of the fluid when being loaded into and discharged from the flow cell 38.

The reaction temperature-controlled component 320 is used to control a temperature of the detection reaction module 318 and the flow cell 38, to meet specific temperature conditions required by the flow cell 38 during the detection reaction. In the embodiment, the reaction temperature-controlled component 320 may be a TEC, any other component, or a combination thereof that can control the temperature.

The fluid transport module 322 is used to take the fluid that will participate in the detection reaction out of a storage module (i.e., the temperature-uncontrolled storage component 324 and/or the temperature-controlled storage component 326), and transport the fluid into the flow cell 38 through the inlet of the flow cell 38. Thus, the sample in the flow cell 38 undergoes the detection reaction, and the waste after the detection reaction is discharged to the waste treatment system 34 through the outlet of the flow cell 38. The fluid transport module 322 may be composed of a pump, a valve, a pipeline, etc.

The temperature-uncontrolled storage component 324 is used to store the detection fluid, which will participate in the detection reaction and has no temperature requirement during the storage. In the embodiment, the temperature-uncontrolled storage component 324 is a container, which contains one or more sub-containers therein. Each sub-container is provided with a sampling needle (not shown) connected to the fluid transport module 322, so that the sub-container can function as an inlet for guiding the detection fluid into the fluid transport module 322.

The temperature-controlled storage component 326 is used to store the detection fluid, which will participate in the detection reaction and has some temperature requirements during the storage (e.g., the detection fluid is required to be stored under a fixed temperature or temperature range). The temperature-controlled storage component 326 is further used to regularly discharge waste, such as condensate liquid, generated due to the control of temperature, to the waste treatment system 34. The temperature-controlled storage component 326 is a container having temperature control functions, which can receive one or more sub-containers therein. Each sub-container is provided with a sampling needle connected to the fluid transport module 322, so that the sub-container can function as an inlet for guiding the detection fluid into the fluid transport module 322.

The storage temperature-controlled component 328 is used to control a temperature of the temperature-controlled storage component 326, so as to meet storage conditions of the detection fluid that has the temperature requirements during the storage. The storage temperature-controlled component 328 may be a TEC, any other component, or a combination thereof that can control the temperature.

The waste treatment system 34 is used to store the waste discharged from the fluid system 33. In the embodiment, the waste can be a waste liquid. In the embodiment, the waste treatment system 34 is further connected to a waste storage device 4 arranged outside the gene sequencer 1, so that the waste can be discharged into the waste storage device 4. The waste includes, but is not limited to, a waste generated after the detection reaction. The waste treatment system 34 includes sub-modules such as a waste collection module 330 and a waste transport module 332.

The waste collection module 330 is used to collect and store all waste discharged from the fluid system 33, including the waste generated after the detection reaction and other waste generated by the fluid system 33 during operation. In the embodiment, when some of the waste lacks flowing power, the waste collection module 330 includes a power component for driving the waste into the waste collection module 330. The power component can be a fluid pump. The waste collection module 330 is provided with a device or container that can receive the waste.

The waste transport module 332 is used to discharge the waste stored in the waste collection module 330 into the waste storage device 4 outside the gene sequencer 1. The waste transport module 332 may be a module composed of fluid components such as a pump, a valve, and a pipeline.

The waste storage device 4 is used to store the waste generated after the detection reaction and other waste. The waste storage device 4 is disposed outside the gene sequencer 1 to facilitate the storage and treatment of waste. The waste storage device 4 can be a customized waste bucket or a special customized waste collection and treatment device.

The transfer system 35 is used to move the flow cell 38 to different positions in the gene sequencer 1 as needed. For example, the flow cell 38 needs to be transferred between the fluid system 33 and the signal detection system 31. When the flow cell 38 that has completed the signal detection needs to perform a next detection reaction, the transfer system 35 removes the flow cell 38 from the detection fixing component 308 of the signal detection system 31, and mounts the flow cell 38 on the detection reaction module 318 of the fluid system 33. When the detection reaction is completed and the signal detection is required, the transfer system 35 further removes the flow cell 38 from the detection reaction module 318, and mounts the flow cell 38 on the detection fixing component 308 of the signal detection system 31. The transfer system 35 may be a robot, a mechanical arm, or a mechanical device such as a conveyor belt for automatic transfer purpose.

The control system 36 is used to control the signal detection system 31, the fluid system 33, the waste treatment system 34, and the transfer system 35 to cooperate with each other. In the embodiment, the control system 36 includes submodules such as a detection control module 334, a temperature control module 336, a fluid control module 338, a waste control module 340, a transfer control module 342, and a system control module 344.

The detection control module 334 is used to control each component of the signal detection system 31 to operate, and convert an instruction sent by the user through the system control module 344 into a signal executable by the components of the signal detection system 31. Furthermore, in the embodiment, the detection control module 334 also controls the power supply to the signal detection system 31. The detection control module 334 may be an electronic control board composed of an electronic component, a board, a cable, etc., or a collection of other electronic control components with specific purposes. It should be noted that when multiple signal detection systems 31 are included in the gene sequencer 1 as needed, the number of the detection control module(s) 334 can also be multiple. Each signal detection system 31 is controlled by a corresponding detection control module 334, and each detection control module 334 can control only one signal detection system 31, to ensure that the signal detection systems 31 are independent during operation and do not interfere with each other.

The temperature control module 336 is used to control the reaction temperature-controlled component 320 and the storage temperature-controlled component 328 in the fluid system 33 to operate, and convert a temperature control command sent by the user through the system control module 344 into a signal executable by each component of the above modules. Furthermore, in the embodiment, the temperature control module 336 also controls the power supply to the above modules. The temperature control module 336 may be an electronic control board composed of an electronic component, a board, a cable, etc., or a combination of other electronic control components with specific purposes.

The fluid control module 338 is used to control each component of the fluid system 33 to operate, and convert an instruction sent by the user through the system control module 344 into a signal executable by the components of the fluid system 33. Furthermore, in the embodiment, the fluid control module 338 also controls the power supply to the fluid system 33. The fluid control module 338 may be an electronic control board composed of an electronic component, a board, a cable, etc., or a combination of other electronic control components with specific purposes. It should be noted that when multiple fluid systems 33 are included in the gene sequencer 1 as needed, each fluid system 33 is controlled by a corresponding fluid control module 338, and each fluid control module 338 can control only one fluid system 33, to ensure that the fluid systems 33 are independent during operation and do not interfere with each other.

The waste control module 340 is used to control each component of the waste treatment system 34 to operate, and convert an instruction sent by the user through the system control module 344 into a signal executable by the components of the waste treatment system 34. Furthermore, in the embodiment, the waste control module 340 also controls the power supply to the waste treatment system 34. The waste control module 340 may be an electronic control board composed of an electronic component, a board, a cable, etc., or a combination of other electronic control components with specific purposes.

The transfer control module 342 is used to control each component of the transfer system 35 to operate, and convert an instruction sent by the user through the system control module 344 into a signal executable by the components of the transfer system 35. Furthermore, in the embodiment, the transfer control module 342 also controls the power supply of the transfer system 35. The transfer control module 342 may be an electronic control board composed of an electronic component, a board, a cable, etc., or a combination of other electronic control components with specific purposes.

The system control module 344 is used to send instructions of the user to the above control modules, and transmit the feedback from the above control modules to the user interaction system 37. The system control module 344 may be an electronic control board composed of an electronic component, a board, a cable, etc., or a combination of other electronic control components with specific purposes.

The user interaction system 37 is used for human-computer interaction, so that the gene sequencing system 3 can receive the instruction from the user and provide feedback of the instruction. In the embodiment, receiving the instruction from the user and providing feedback to the user by the gene sequencing system 3 mainly involve two aspects. The first aspect is the entire operation software developed to allow interaction with the system control module 344, so that the user can input relevant parameters to run the detection reaction of the whole device. The second aspect is the signal processing system 32 providing the detection data after being processed, so that the user can intuitively see the detection results. In the embodiment, the user interaction system 37 is composed of submodules such as a visual interaction module 346 and an input module 348. The user interaction system 37 includes an information I/O interface arranged on the housing 2. For example, the visual interaction module 346 includes the display interface 201, and the input module 348 includes the keyboard/mouse 207 arranged on the housing 2.

The visual interaction module 346 is used to visually display a human-computer interaction content to facilitate the human-computer interaction. The visual interaction module 346 can be any model of display or touch screen, or another device for visual output.

The input module 348 is used to input various instructions of the user to the whole device. The input module 348 can be an input and output device, including any model of keyboard, mouse, and any other devices for input.

In FIG. 2, a long dotted line is used to connect the transfer system 35 to the signal detection system 31 and the fluid system 33, which means that the flow cell 38 is transferred between the signal detection system 31 and the fluid system 33. After being transferred, the flow cell 38 needs to be fixed on a corresponding one of the two systems to complete the detection or the reaction process. The control of the flow cell 38 by the signal detection system 31 and the fluid system 33 is a short-term control behavior. When the flow cell 38 is obtained by the transfer system 35, the flow cell 38 is completely uncontrollable by the signal detection system 31 or the fluid system 33, that is, the flow cell 38 is only controlled by the transfer system 35 and finally transferred to the specified position.

In FIG. 2, a solid line is used to connect the signal detection system 31 to the signal processing system 32, which represents a signal/data transmission between the signal detection system 31 and the signal processing system 32. A solid line is used to successively connect the fluid system 33, the waste treatment system 34, and the waste storage device 4, which represents a substance transmission among the fluid system 33, the waste treatment system 34, and the waste storage device 4. A solid line is used to connect the detection reaction module 318 to the reaction temperature-controlled component 320, and a solid line is used to connect the temperature-controlled storage component 326 to the storage temperature-controlled component 328, which mean that the reaction temperature-controlled component 320 needs to control the temperature of the detection reaction module 318 as needed, and the storage temperature-controlled component 328 needs to control the temperature of the temperature-controlled storage component 326 as needed. Therefore, in the embodiment, the solid lines for connecting different modules/components in FIG. 2 represent the transmission processes of data or substance.

In FIG. 2, dotted lines are used to connect the control system 36 to each of the signal detection system 31, the fluid system 33, the waste treatment system 34, and the user interaction system 37, which represent control and information exchange of the control system 36 to the signal detection system 31, the fluid system 33, the waste treatment system 34, and the user interaction system 37. Therefore, in the embodiment, the dotted lines in FIG. 2 represent a continuous or discontinuous transmission process of the control signal.

In addition, in FIG. 2, the flow cell 38 is placed in each of the signal detection system 31 and the fluid system 33, and is represented by a long dotted line box. This means that the flow cell 38 is not always disposed in one of the above two positions, but can be transferred to and fixed in one of the two positions by the transfer system 35 according to the sequencing progress. In another embodiment, each of the above two positions can simultaneously have a flow cell 38 thereon. The signal detection system 31 or the fluid system 33 starts to work only when the flow cell 38 is disposed thereon.

Figure 3:
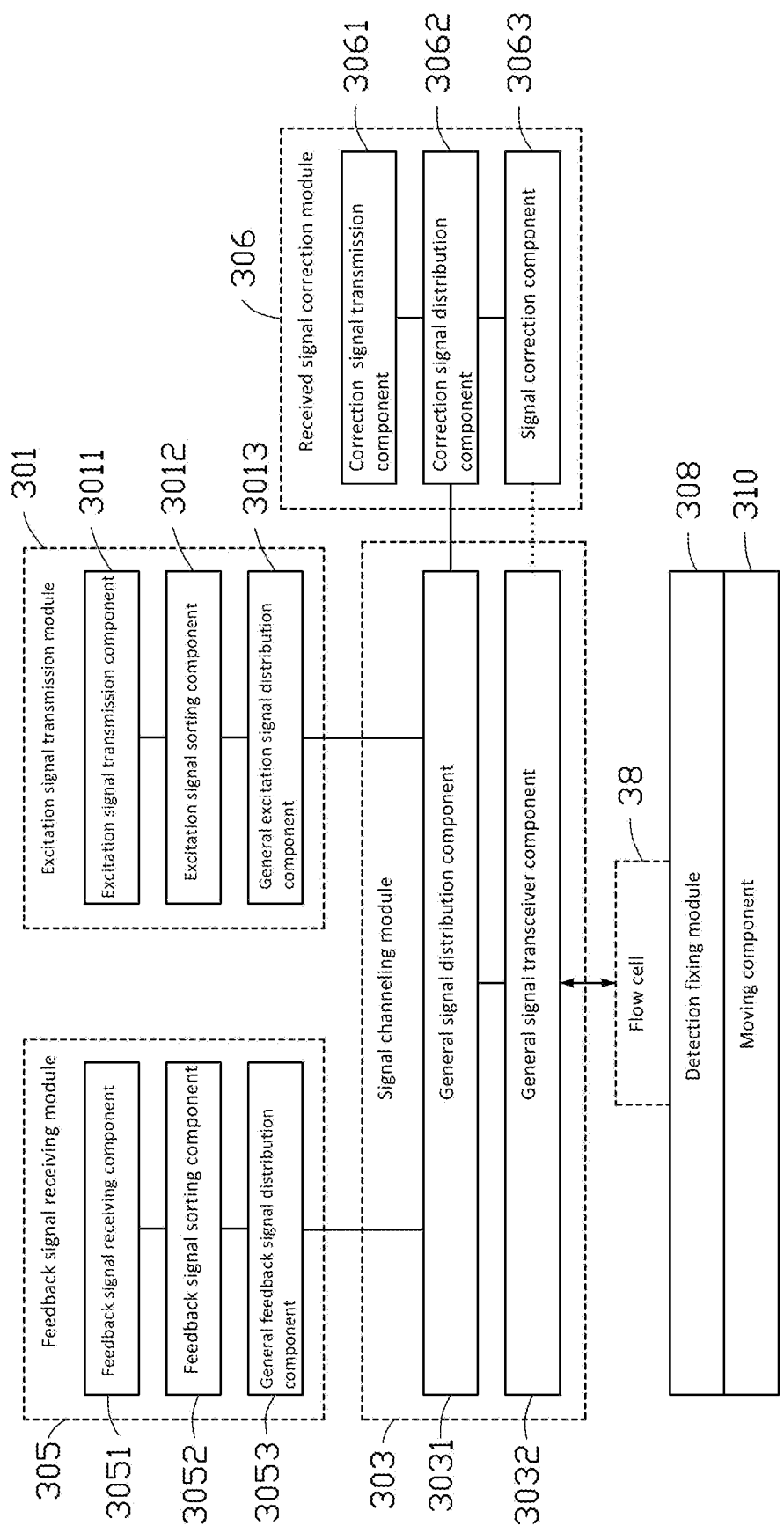
FIG. 3 is a block diagram of a signal detection system of the gene sequencing system in FIG. 2.

Referring to FIG. 3, an embodiment of a detailed diagrammatic view of each module of the signal detection system 31 is illustrated. The excitation signal transmission module 301 includes an excitation signal transmission component 3011, an excitation signal sorting component 3012, and a general excitation signal distribution component 3013. The feedback signal receiving module 305 includes a feedback signal receiving component 3051, a feedback signal sorting component 3052, and a general feedback signal distribution component 3053. The signal channeling module 303 includes a general signal distribution component 3031 and a general signal transceiver component 3032. The received signal correction module 306 includes a correction signal transmission component 3061, a correction signal distribution component 3062, and a signal correction component 3063. The above components are described in detail as follows.

The excitation signal transmission component 3011 is used to transmit the excitation signal towards the sample in the flow cell 38, and the excitation signal can excite the feedback signal from the sample. By detecting the feedback signal from the sample, it is possible to analyze whether the sample contains a certain substance. When the feedback signal is electrically excited, the excitation signal transmission component 3011 can be a trigger device that can generate a voltage, a current, or charges. When the feedback signal is optically excited, the excitation signal transmission component 3011 can be a light source device such as a laser and an LED lamp.

The excitation signal sorting component 3012 is used to sort the transmitted excitation signal, so that the excitation signal can meet some receiving requirements of the sample. When the feedback signal is electrically excited, the excitation signal sorting component 3012 can be a circuit module having shaping or filtering functions. When the feedback signal is optically excited, the excitation signal sorting component 3012 can be an optical device such as a lens, a mirror, and a filter.

The general excitation signal distribution component 3013 is used to group and summarize the excitation signal, so as to simplify the transmission requirements of the excitation signal and also realize the sorting of the excitation signal. When the feedback signal is electrically excited, the general excitation signal distribution component 3013 can be a circuit module having shaping or filtering functions. When the feedback signal is optically excited, the general excitation signal distribution component 3013 can be an optical device such as a lens, a mirror, and a filter.

In the embodiment shown in FIG. 3, the excitation signal transmission module 301 includes A general excitation signal distribution component(s) 3013, and A×M excitation signal transmission component(s) 3011, and A×M excitation signal sorting component(s) 3012. Therefore, every M excitation signal transmission component(s) 3011 and every M excitation signal sorting component(s) 3012 correspond to one general excitation signal distribution component 3013.

The feedback signal receiving component 3051 is used to receive the feedback signal from the sample, which is excited by the excitation signal. By detecting the feedback signal, whether the sample contains a certain substance or component can be analyzed. When the feedback signal is electrically excited, the feedback signal receiving component 3051 may be a recording device of a voltage, a current, or charges. When the feedback signal is optically excited, the feedback signal receiving component 3051 can be a photosensitive recording device such as an area array camera (such as CCD), a line scanning camera (such as TDI), and CMOS.

The feedback signal sorting component 3052 is used to sort the received feedback signal, so as to meet some recording requirements of the feedback signal. When the feedback signal is electrically excited, the feedback signal sorting component 3052 can be a circuit module having shaping or filtering functions. When the feedback signal is optically excited, the feedback signal sorting component 3052 may be an optical device such as a lens, a mirror, a filter, or a combination thereof.

The general feedback signal distribution component 3053 is used to group and summarize the received feedback signal, so as to simplify the recording requirements of the feedback signal and also realize the sorting of the feedback signal. When the feedback signal is electrically excited, the general feedback signal distribution component 3053 can be a circuit module having shaping or filtering functions. When the feedback signal is optically excited, the general feedback signal distribution component 3053 may be an optical device such as a lens, a mirror, a filter, or a combination thereof.

In the embodiment shown in FIG. 3, the feedback signal receiving module 305 includes B general feedback signal distribution component(s) 3053, B×N feedback signal receiving component(s) 3051, and B×N feedback signal sorting component(s) 3052. Every N feedback signal receiving component(s) 3051 and every N feedback signal sorting component(s) 3052 correspond to one general feedback signal distribution component 3053.

The general signal distribution component 3031 is used to group the excitation signal and the feedback signal, so as to simplify the transmission requirements of the excitation signal and the recording requirements of the feedback signal and also realize the sorting of the excitation signal and the feedback signal. When the feedback signal is electrically excited, the general signal distribution component 3031 can be a circuit module having shaping or filtering functions. When the feedback signal is optically excited, the general signal distribution component 3031 may be an optical device such as a lens, a mirror, a filter, or a combination thereof.

The general signal transceiver component 3032 is used to realize a transmission of the excitation signal from the signal channeling module 303 to the sample, and a transmission of the feedback signal from the sample to the signal channeling module 303. The general signal transceiver component 3032 can perform fine adjustment when being controlled by the signal correction component 3063, to achieve best transmitting and receiving effects of the excitation signal and the feedback signal. When the feedback signal is electrically excited, the general signal transceiver component 3032 can be an electronic release device such as a probe and a wire. When the feedback signal is optically excited, the general signal transceiver component 3032 can be an optical device such as an objective lens, a mirror, a filter, or a combination thereof.

The correction signal transmission component 3061 is used to transmit a correction signal towards the sample. The correction signal does not excite the feedback signal from the sample, but can be used to detect a working state of the signal channeling module 303 to determine whether the signal channeling module 303 is in the best working state. For the detection of an electrical signal, the correction signal transmission component 3061 may be a trigger device of a voltage, a current, or charges. For the detection of an optical signal, the correction signal transmission component 3061 may be a light source device such as a laser and an LED.

The correction signal distribution component 3062 is used to transmit the correction signal transmitted by the correction signal transmission component 3061 to the general signal distribution component 3031, or receive the correction signal sent back from the general signal distribution component 3031, so that the correction signal sent back from the general signal distribution component 3031 can be transmitted to the signal correction component 3063. The signal correction component 3063 determines whether to perform fine adjustment to the general signal transceiver component 3032. For the detection of an electrical signal, the correction signal distribution component 3062 can be a circuit module having shaping or filtering functions. For the detection of an optical signal, the correction signal distribution component 3062 may be an optical device such as a lens, a mirror, a filter, or a combination thereof.

The signal correction component 3063 is used to control the general signal transceiver component 3032 to perform fine adjustment, so as to optimize the transmitting and receiving effects of the excitation signal and the feedback signal. For the detection of an electrical signal, the signal correction component 3063 can be a circuit module having shaping or filtering functions. For the detection of an optical signal, the signal correction component 3063 may be an optical device with an auto focusing function.

In FIG. 3, a solid line represents a transmission channel of the excitation signal or the feedback signal among different components. In the embodiment, there are three important transmission channels. The first transmission channel is that the excitation signal transmits from the excitation signal transmission component 3011, then successively passes through the excitation signal sorting component 3012, the general excitation signal distribution component 3013, the general signal distribution component 3031, and the general signal transceiver component 3032, and finally reaches the flow cell 38, so that the sample to be tested is excited by the excitation signal. The second transmission channel is that the feedback signal starts from the flow cell 38, then successively passes through the general signal transceiver component 3032, the general signal distribution component 3031, the general feedback signal distribution component 3053, and the feedback signal sorting component 3052, and finally reaches the feedback signal receiving component 3051, so that the feedback signal sent by the sample can be received. The third transmission channel is that the correction signal starts from the correction signal transmission component 3061, then successively passes through the correction signal distribution component 3062, the general signal distribution component 3031, and the general signal transceiver component 3032, then reaches the flow cell 38, and returns. The returned correction signal passes through the general signal transceiver component 3032, the general signal distribution component 3031, the correction signal distribution component 3062, and reaches the signal correction component 3063, so that the working state of the signal channeling module 303 can be detected and evaluated by the correction signal.

In FIG. 3, the dotted line represents the feedback of the signal correction component 3063 responding to the general signal transceiver component 3032, which means that the signal correction component 3063 adjusts the state of the general signal transceiver component 3032 according to the correction signal. For the detection of an electrical signal, the adjustment of the general signal transceiver component 3032 can be an adjustment of the position of an electron probe or other electronic equipment relative to the sample, or an adjustment of a voltage, a current, and other electronic indicators released by the general signal transceiver component 3032 to the sample. For the detection of an optical signal, the adjustment of the general signal transceiver component 3032 can be automatic focusing or a fine adjustment of the position of an objective lens.

Figure 4:
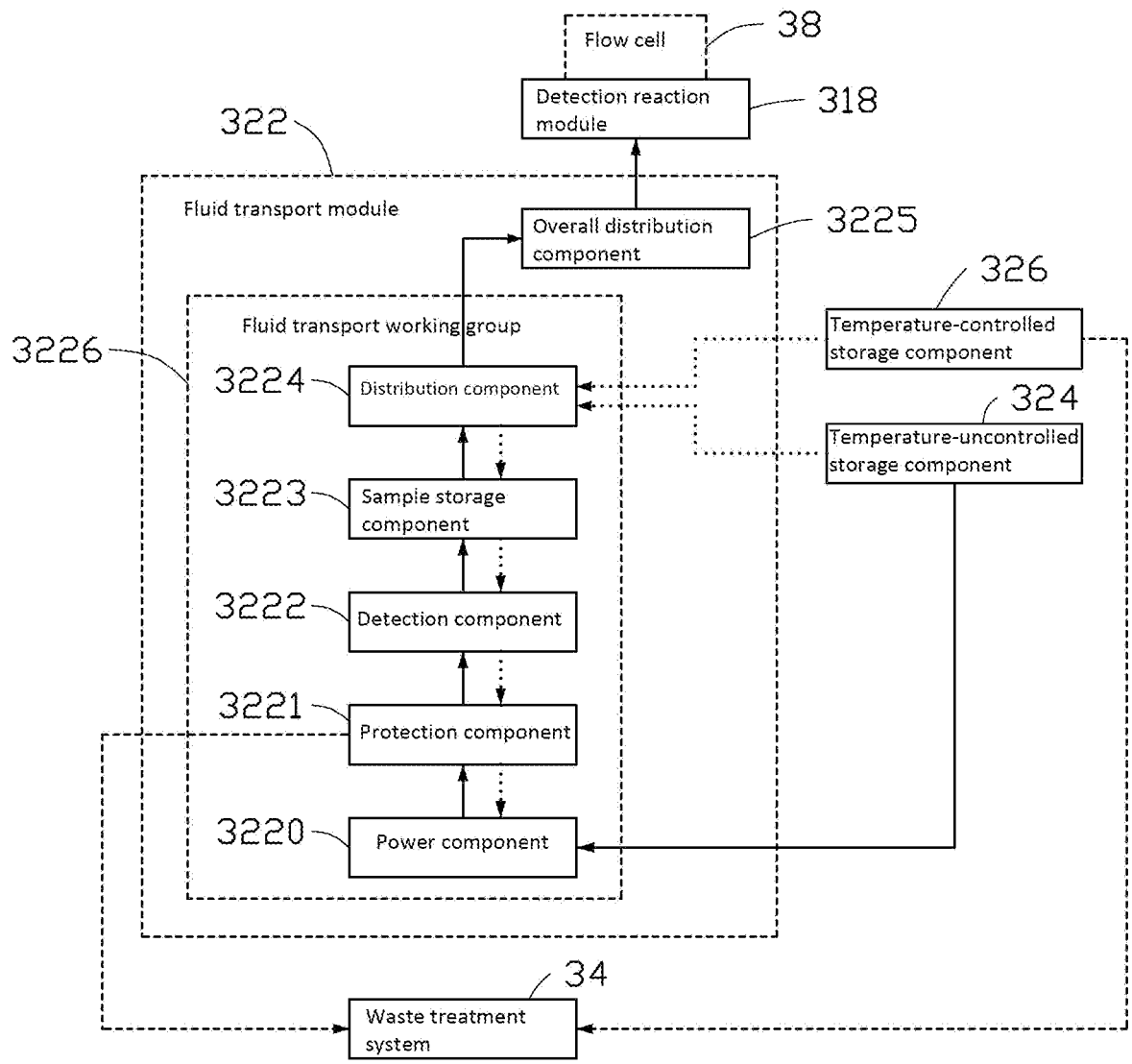
FIG. 4 is a block diagram of a fluid transport module of the gene sequencing system in FIG. 2.

Referring to FIG. 4, an embodiment of a detailed diagrammatic view of the fluid transport module 322 is further illustrated. The fluid transport module 322 includes components such as a power component 3220, a protection component 3221, a detection component 3222, a sample storage component 3223, a distribution component 3224, and an overall distribution component 3225. The above components are described in detail as follows.

The power component 3220 is used to create a pressure gradient (pressure difference) in the fluid system 33, which drives the detection fluid to flow in the fluid system 33. The power component 3220 can be any type of pump used to drive a fluid to flow, such as a common type of syringe pump, plunger pump, diaphragm pump, gear pump, and peristaltic pump, or a gas (such as high-pressure air) pressure source.

The protection component 3221 is used to allow the fluid system 33 to safely operate. When the fluid system 33 is abnormal, a protection mechanism is initiated to avoid damages to other components in the fluid system 33. The protection component 3221 can be any type of valve, such as solenoid valve, one-way valve, and pressure relief valve, or another component controlling the opening and closing of pipelines, such as a manual switch.

The detection component 3222 is used to detect a preset index of the fluid system 33 to determine whether the preset index of the fluid system 33 is abnormal. The detection component 3222 can be any type of sensor, such as pressure sensor, flow sensor, speed sensor, and bubble sensor.

The sample storage component 3223 is used to temporarily store the detection fluid. The sample storage component 3223 may be a container with a specific shape or may be a section of pipeline.

The distribution component 3224 is used to connect different pipelines and components of the fluid system 33 as needed. The distribution component 3224 can be any type of solenoid valve, such as multi-way direct acting solenoid valve and multi-way pilot solenoid valve, or any type of rotary valve, or a combination of solenoid valves and/or rotary valves.

In the embodiment shown in FIG. 4, the fluid transport module 322 includes M fluid transport working group(s) 3226. Each fluid transport working group 3226 at least includes a power component 3220, a protection component 3221, a detection component 3222, a sample storage component 3223, and a distribution component 3224, so that a portion of the detected liquid can be absorbed from the temperature-controlled storage component 326 and/or the temperature-uncontrolled storage component 324, and then temporarily stored in the sample storage component 3223. The beneficial effect of the sample storage component 3223 temporarily storing the detection fluid is that when one of the fluid transport working groups 3226 injects the detection fluid into the detection reaction module 318 and the flow cell 38 through the overall distribution component 3225, the other fluid transport working group(s) 3226 can use this time to absorb the detection fluid for preparation, so that the preparation time before the injection of the detection fluid can be saved. Therefore, in the embodiment, the fluid transport module 322 totally has M protection component(s) 3221, M detection component(s) 3222, M sample storage component(s) 3223, and M distribution component(s) 3224. All the fluid transport working groups 3226 are connected to the overall distribution component 3225, so that which one of the fluid transport working groups 3226 is connected to the detection reaction module 318 can be dispatched in a unified way. In addition, in other embodiments, the positions of the protection component 3221, the detection component 3222, and the sample storage component 3223 can be interchanged, but the above functions can still be realized.

The overall distribution component 3225 has a function similar to that of the distribution component 3224, and is used to connect different pipelines and components in the fluid system 33 as needed. The overall distribution component 3225 can be any type of solenoid valve, such as multi-way direct acting solenoid valves and multi-way pilot solenoid valves, or any type of rotary valve, or a combination of solenoid valves and/or rotary valves.

In FIG. 4, the dotted line with arrow represents a flow direction of the fluid when one of the fluid transport working groups 3226 of the fluid transport module 322 absorbs the detection fluid for preparation. Under the pressure gradient generated by the power component 3220, the detection fluid from the temperature-controlled storage component 326 or the temperature-uncontrolled storage component 324 is temporarily stored in the sample storage component 3223 when passing through the distribution component 3224.

In FIG. 4, the solid line with arrow represents a flow direction of the fluid when one of the fluid transport working groups 3226 of the fluid transport module 322 outputs the detection fluid to the detection reaction module 318 and the flow cell 38. Under the pressure gradient generated by the power component 3220, the detection fluid temporarily stored in the sample storage component 3223 flows out of the sample storage component 3223, and then to the detection reaction module 318 when passing through the distribution component 3224 and the overall distribution component 3225. It should be noted that in the solid line connecting the temperature-uncontrolled storage component 324 to the power component 3220, the arrow means that when the power component 3220 continuously creates the pressure gradient, the fluid from the temperature-uncontrolled storage component 324 may need to be supplemented to the power component 3220. The fluid may be a fluid or a high-pressure gas stored in the temperature-uncontrolled storage component 324.

In other embodiments, the power component 3220 does not connect to the temperature-uncontrolled storage component 324, but instead connecting to another storage device. The storage device stores the fluid, which may be a liquid or a high-pressure gas. When the power component 3220 continuously creates the pressure gradient that drives the fluid stored in the sample storage component 3223 into the flow cell 38, the fluid in the storage device is supplemented to the power component 3220.

In FIG. 4, a long dotted line with arrow connects the protection component 3221 and the waste treatment system 34 together, and a long dotted line with arrow connects the temperature-controlled storage component 326 and the waste treatment system 34 together. The connection of the protection component 3221 and the waste treatment system 34 represents that when there is a problem with the fluid transport working group 3226, the protection component 3221 begins to work, which may discharge some excess fluid from the protection component 3221 to the waste treatment system 34. The connection of the temperature-controlled storage component 326 and the waste treatment system 34 represents that since a temperature difference exists between the temperature-controlled storage component 326 and the ambient environment, a condensate liquid may be generated when the temperature of the temperature-controlled storage component 326 is lower than the ambient temperature. The condensate liquid is then collected by the waste treatment system 34.

Figure 5:
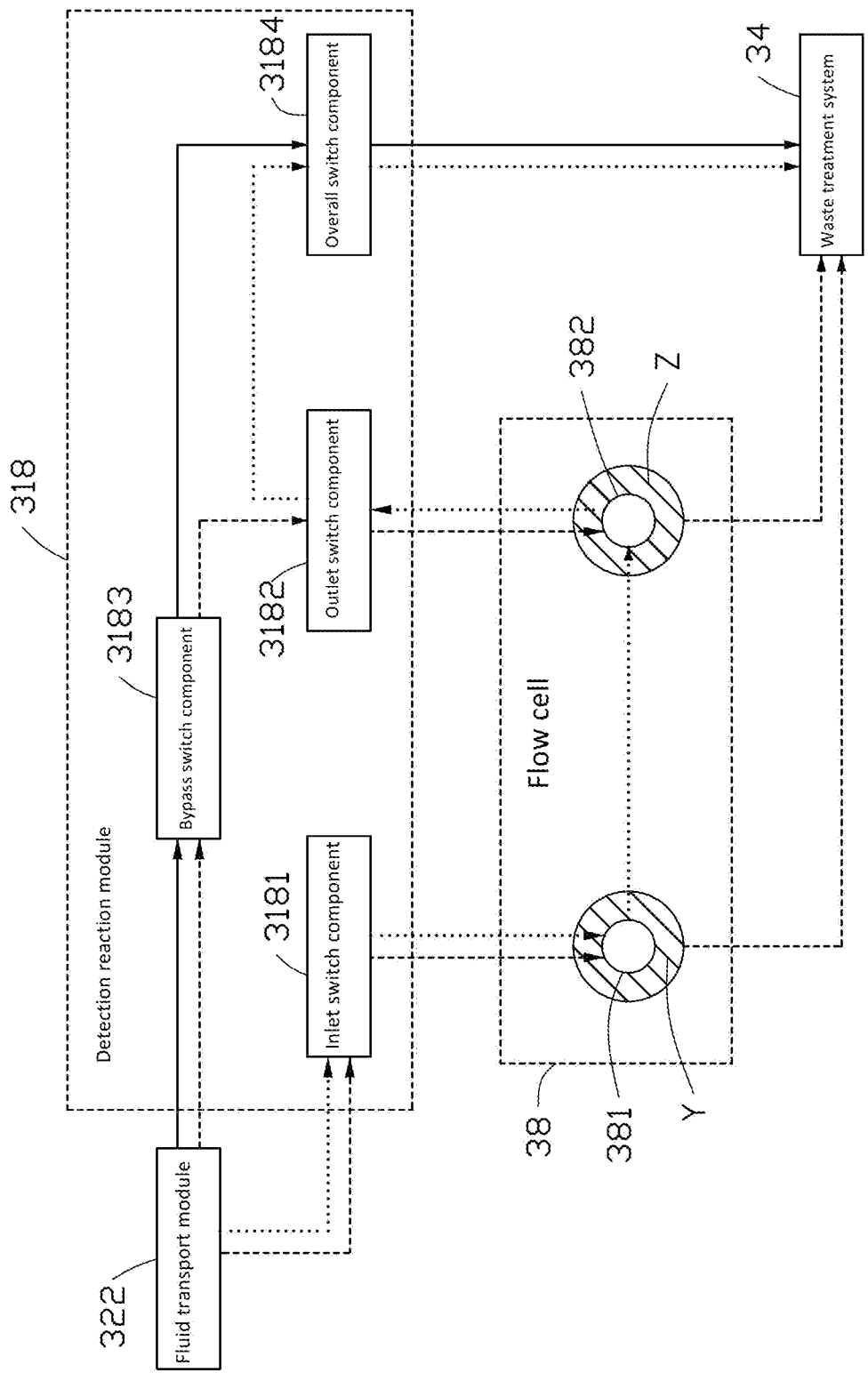
FIG. 5 is a block diagram of a detection reaction module of the gene sequencing system in FIG. 2.

FIG. 5 is a detailed diagrammatic view of an embodiment of the detection reaction module 318. The detection reaction module 318 includes an inlet switch component 3181, an outlet switch component 3182, a bypass switch component 3183, an overall switch component 3184, and other components. The components of the detection reaction module 318 are described in detail as follows.

The inlet switch component 3181 is used to control the pipeline at the inlet(s) of the flow cell 38 to open or close. The inlet switch component 3181 can be any type of solenoid valve, such as multi-way direct acting solenoid valves, multi-way pilot solenoid valves, or any type of rotary valve, or a combination of solenoid valves and/or rotary valves. When the flow cell 38 includes multiple inlets, each inlet of the flow cell 38 corresponds to one inlet switch component 3181. Thus, each inlet of the flow cell 38 can be controlled by one inlet switch component 3181, and each inlet switch component 3181 can be independently controlled.

The outlet switch component 3182 is used to control the pipeline at the outlet(s) of the flow cell 38 to open or close. The outlet switch component 3182 can be any type of solenoid valve, such as multi-way direct acting solenoid valves, multi-way pilot solenoid valves, or any type of rotary valve, or a combination of solenoid valves and/or rotary valves. When the flow cell 38 includes multiple outlets, each outlet of the flow cell 38 corresponds to one outlet switch component 3182. Thus, each outlet of the flow cell 38 can be controlled by one outlet switch component 3182, and each outlet switch component 3182 can be independently controlled.

The bypass switch component 3183 is used to control the pipeline at the inlet(s) of the flow cell 38 to open or close. The bypass switch component 3183 can be any type of solenoid valve, such as multi-way direct acting solenoid valves, multi-way pilot solenoid valves, or any type of rotary valves, or a combination of solenoid valves and/or rotary valves.

The overall switch component 3184 is used to control the pipeline at a main outlet of the detection reaction module 318 to open or close. The overall switch component 3184 can be any type of solenoid valve, such as multi-way direct acting solenoid valves, multi-way pilot solenoid valves, or any type of rotary valve, or a combination of solenoid valves and/or rotary valves.

In FIG. 5, the detection reaction module 318 can include M inlet switch component(s) 3181, N outlet switch component(s) 3182, and X bypass switch component(s) 3183. Each inlet switch component 3181 and each bypass switch component 3183 independently control one pipeline connecting the fluid transport module 322. All the outlet switch component(s) 3182 are connected to the overall switch component 3184.

In FIG. 5, the solid line with arrow starts from the fluid transport module 322, successively connects the bypass switch component 3183 and the overall switch component 3184, and finally arrives at the waste treatment system 34. This process represents that when some fluid, which is injected into the detection reaction module 318 by the fluid transport module 322, cannot be further loaded into the flow cell 38 for the detection reaction, a path for discharging such fluid to the waste treatment system 34. The fluid includes, but is not limited to, a fluid used to clean the sample storage component 3223 or other pipelines of the fluid transport module 322, a fluid that has risk of cross contamination and need to be removed, or the detection fluid remaining after some steps of the detection reaction.

In FIG. 5, the dotted line with arrow starts from the fluid transport module 322, successively connects the inlet switch component 3181, a flow cell inlet 381, a flow cell outlet 382, the outlet switch component 3182, and the overall switch component 3184, and finally arrives at the waste treatment system 34. This process represents that when the detection fluid, which is injected into the detection reaction module 318 by the fluid transport module 322, has participated in the detection reaction, a path for the detection fluid to flow into the flow cell 38 through the flow cell inlet 381 and further flow out of the flow cell 38 through the flow cell outlet 382. The fluid is mainly the detection fluid and other fluids that need to be injected into the flow cell 38.

The processes represented by the solid line with arrow and the dotted line with arrow must pass through the overall switch component 3184 before entering the waste treatment system 34, which are powered by the power component 3220 of the fluid transport module 322.

In FIG. 5, a long dotted line with arrow has two paths. The first path starts from the fluid transport module 322, successively connects the inlet switch component 3181 and the flow cell inlet 381, passes through a shaded peripheral area Y at the flow cell inlet 381, and finally arrives at the waste treatment system 34. The second path starts from the fluid transport module 322, successively connects the bypass switch component 3183, the outlet switch component 3182, and the flow cell outlet 382, passes through a shaded peripheral area Z at the flow cell outlet 382, and finally arrives at the waste treatment system 34. It should be noted that when the second path is executed, the overall switch component 3184 needs to be closed. The shaded peripheral area at the flow cell inlet 381 or the flow cell outlet 382 represents a sealing area between the detection reaction module 318 and the flow cell inlet 381 or between the detection reaction module 318 and the flow cell outlet 382. Since the flow cell 38 needs to be periodically transferred, the sealing area needs to be cleaned in time to avoid residue of the detection fluid. According to the above descriptions, the two paths respectively represent two processes that when the fluid transport module 322 injects some fluid into the detection reaction module 318 for cleaning the sealing areas Y and Z respectively between the detection reaction module 318 and the flow cell inlet 381 and between the detection reaction module 318 and the flow cell outlet 382, the two paths discharge the cleaning fluid to the waste treatment system 34. It should be noted that the above two processes can only be performed after the flow cell 38 has been transferred, so as to prevent the cleaning fluid from polluting the sample inside the flow cell 38. If the areas Y and Z are open, the waste treatment system 34 is required to provide a power component for transferring the cleaning fluid that overflows from the flow cell inlet 381 and the flow cell outlet 382. If the areas Y and Z are sealed, the waste treatment system 34 is not required to provide the power component, but additional tools are required to seal the areas Y and Z while leaving the liquid inlet and outlet channels unblocked.

Figure 6:
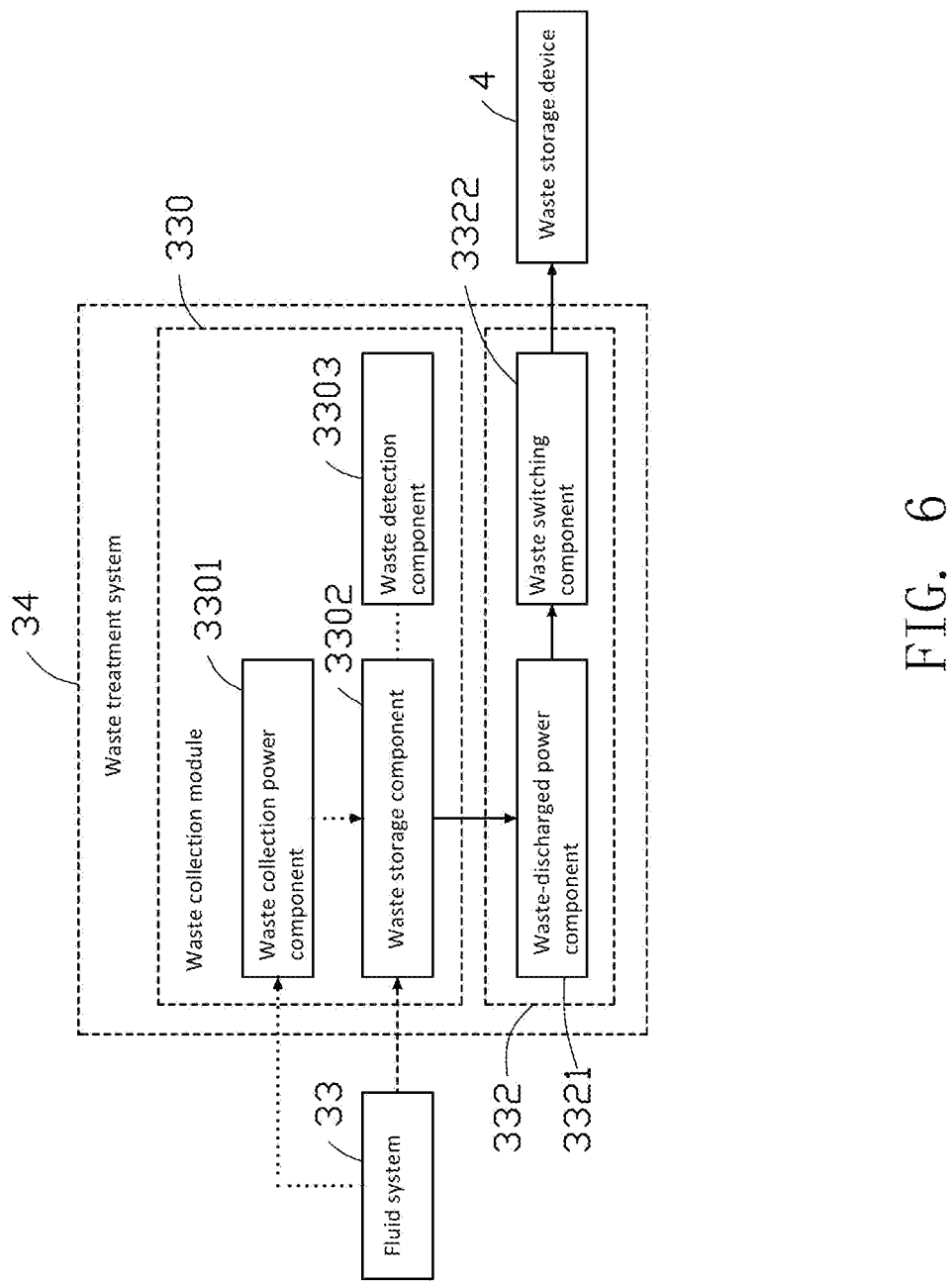
FIG. 6 is a block diagram of a waste treatment system of the gene sequencing system in FIG. 2.

FIG. 6 is a detailed diagrammatic view of an embodiment of the waste collection module 330 and the waste transport module 332. The waste collection module 330 includes components such as a waste collection power component 3301, a waste storage component 3302, and a waste detection component 3303. The waste transport module 332 includes components such as a waste-discharged power component 3321 and a waste switching component 3322.

When some waste that lack flowing power, the waste collection power component 3301 is used to provide power for driving such waste. The waste collection power component 3301 can be any type of pump for driving the fluid to move, such as a common type of syringe pump, plunger pump, diaphragm pump, gear pump, and peristaltic pump, or a gas pressure source such as high-pressure air.

The waste storage component 3302 is used to store the waste after the detection reaction. The waste storage component 3302 can also temporarily store the waste of all fluid systems 33 in the gene sequencer 1. The waste storage component 3302 may be a container with a specific shape.

The waste detection component 3303 is used to detect an amount of waste stored in the waste storage component 3302. When the amount of waste in the waste storage component 3302 reaches a preset threshold, the waste transport module 332 discharges the waste into the waste storage device 4. The waste detection component 3303 can be a gravity detection device that can judge the amount of waste by gravity, a volume detection device that can judge the amount of waste by volume, or a height detection device that can judge the amount of waste collected by a height of fluid level.

The waste-discharged power component 3321 is used to provide power for transporting the waste from the waste storage component 3302 to the waste storage device 4. The waste-discharged power component 3321 can be any type of pump for driving the fluid to move, such as a common type of syringe pump, plunger pump, diaphragm pump, gear pump, and peristaltic pump, or a gas pressure source such as high-pressure air.

The waste switching component 3322 is arranged on the housing 2 of the gene sequencer 1, and is a component for connecting the internal pipeline to the external pipeline. The waste switching component 3322 can be any type of connector, such as a through plate connector.

In FIG. 6, the dotted line with arrow starts from the fluid system 33, connects the waste collection power component 3301, and finally arrives at the waste storage component 3302. This process represents that when some waste of the fluid system 33 lacks flowing power, a path for driving the waste by the waste collection power component 3301 of the waste collection module 330, and the waste is then temporary stored in the waste storage component 3302. The waste includes, but is not limited to, the condensate liquid generated by the temperature-controlled storage component 326 when the temperature is lower than the outside environment, and the cleaning fluid pushed to the peripheral areas Y and Z by the detection reaction module 318 when cleaning the sealed peripheral areas Y and Z.

In FIG. 6, a long dotted line with arrow starts from the fluid system 33 and directly reaches the waste storage component 3302. This process represents the path for pushing the waste directly into the waste storage component 3302 when the fluid system 33 can provide power. The power of this process is provided by the power component 3220 of the fluid transport module 322 in the fluid system 33, so the waste can be discharged directly into the waste storage component 3302. The waste includes, but is not limited to, the waste generated by the detection reaction in the flow cell 38, and the waste discharged by the fluid system 33 when cleaning the sample storage component 3223 or other pipelines.

In FIG. 6, the solid line with arrow starts from the waste storage component 3302, passes through the waste switching component 3322, and arrives at the waste storage device 4. This process represents the path for transporting the waste from the waste storage component 3302 to the waste storage device 4 when the amount of the waste contained in the waste storage component 3302 exceeds the preset threshold. The waste includes all waste generated by all fluid systems 33 of the whole device within a certain period of time.

In FIG. 6, a dotted line represents measurement of the amount of waste in the waste storage component 3302 by the waste detection component 3303. When the waste detection component 3303 detects that the amount of waste in the waste storage component 3302 exceeds the preset threshold, the control system 36 controls the waste-discharged power component 3321 of the waste transport module 332 to start working, which transports the waste in the waste storage component 3302 to the waste storage device 4 for storage.

Figure 7:
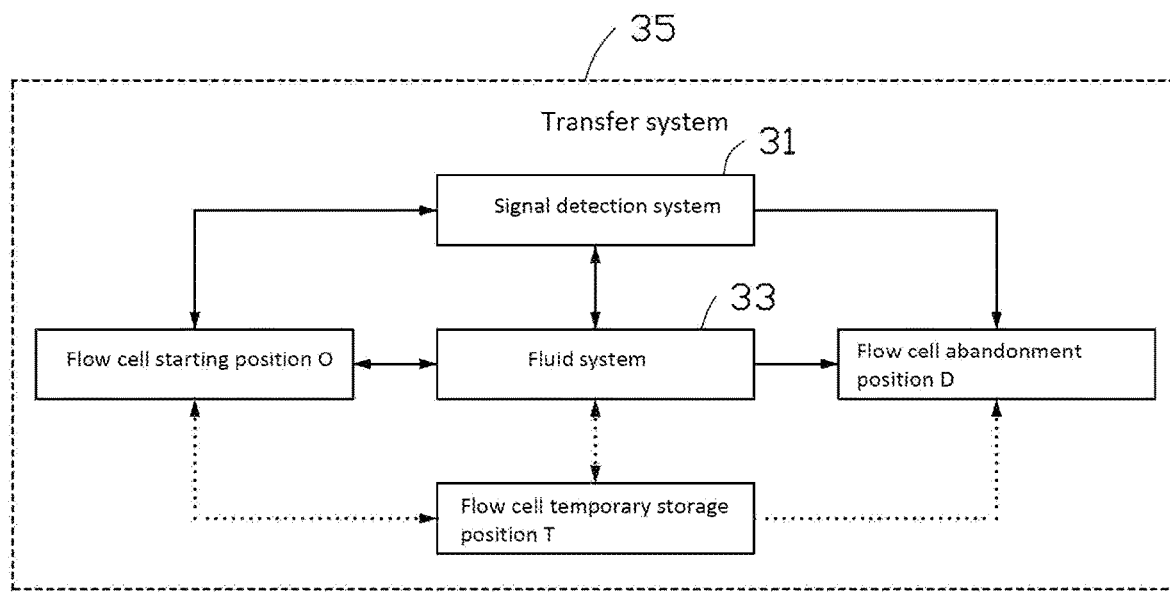
FIG. 7 is a block diagram showing an operation logic of a transfer system of the gene sequencing system in FIG. 2.

Referring to FIG. 7, an embodiment of operation logics of the transfer system 35 is shown. The object transferred by the transfer system 35 is the flow cell 38, which is a container for loading the sample for detection reaction. The flow cell 38 may be a closed sequencing chip or an open substrate for loading the sample. In the embodiment, main destinations of the flow cell 38 include a flow cell starting position O, the $N^{th}$ fluid system 33, the $M^{th}$ signal detection system 31, a flow cell temporary storage position T, and a flow cell abandonment position D. When there are multiple fluid systems 33 and signal detection systems 31 in the gene sequencer 1, N and M respectively represent any number of the fluid systems 33 and the signal detection systems 31.

The flow cell starting position O is the starting position of the detection of the sample in the flow cell 38. In the embodiment, the flow cell starting position O is a position of the flow cell inletting interface 203. The user places the flow cell 38 containing the sample at the flow cell starting position O. After being confirmed by the user interaction system 37, the transfer system 35 transfers the flow cell 38 into the device for detection reaction.

The position of the flow cell 38 in the $N^{th}$ fluid system 33 means the position on the detection reaction module 318 of the $N^{th}$ fluid system 33. When the flow cell 38 is mounted on the position, the control system 36 loads the detection fluid into the flow cell 38 for the detection reaction.

The position of the flow cell 38 in the $M^{th}$ signal detection system 31 means a position on the detection fixing component 308 of the $M^{th}$ signal detection system 31. When the flow cell 38 is mounted on the position, the control system 36 controls the $M^{th}$ signal detection system 31 to apply the excitation signal to the sample, and then collects the feedback signal of the sample.

The flow cell temporary storage position T means a fixed position in the gene sequencer 1 for temporary storing the flow cell 38.

The flow cell abandonment position D means a position where the flow cell 38 is abandoned after the detection reaction is completed or interrupted. The transfer system 35 places the abandoned flow cell 38 at this position, which is then collected and processed by the user.

In FIG. 7, a solid line with arrow starts from the flow cell starting position O, and then connects to the $N^{th}$ fluid system 33, the $M^{th}$ signal detection system 31, and the flow cell abandonment position D. The flow cell starting position O, the $N^{th}$ fluid system 33, and the $M^{th}$ signal detection system 31 are connected in two directions, but the $N^{th}$ fluid system 33, the $M^{th}$ signal detection system 31, and the flow cell abandonment position D are connected in a single direction. This path represents the process that the user places the flow cell 38 at the flow cell starting position O, and then the whole device controls the flow cell 38 to perform the detection reaction and the signal detection between the $N^{th}$ fluid system 33 and the $M^{th}$ signal detection system 31. However, once the flow cell 38 is abandoned, the abandoned flow cell 38 cannot be returned to the transfer system 35 for further use. The specific execution path in the detection reaction can be customized according to different principles of the detection reaction.

In FIG. 7, the dotted line with arrow starts from the flow cell starting position O, and then connects to the flow cell temporary storage position T and the flow cell abandonment position D. The flow cell starting position O, the flow cell temporary storage position T, and the $N^{th}$ fluid system 33 are connected in two directions, but the flow cell temporary storage position T and the flow cell abandonment position D are connected in a single direction. This path represents the process of moving the flow cell 38 from the flow cell starting position O or the $N^{th}$ fluid system 33 to the flow cell temporary storage position T for temporary storage, or the process for some material used by the user to enter the transfer system 35 from the flow cell starting position O and then clean the sealing areas Y and Z between the detection reaction module 318 of the $N^{th}$ fluid system 33 and the flow cell 38. However, once the flow cell 38 or the material are abandoned, they cannot be returned to the transfer system 35 for further use. The specific execution path can be customized according to different needs.

Figure 8:
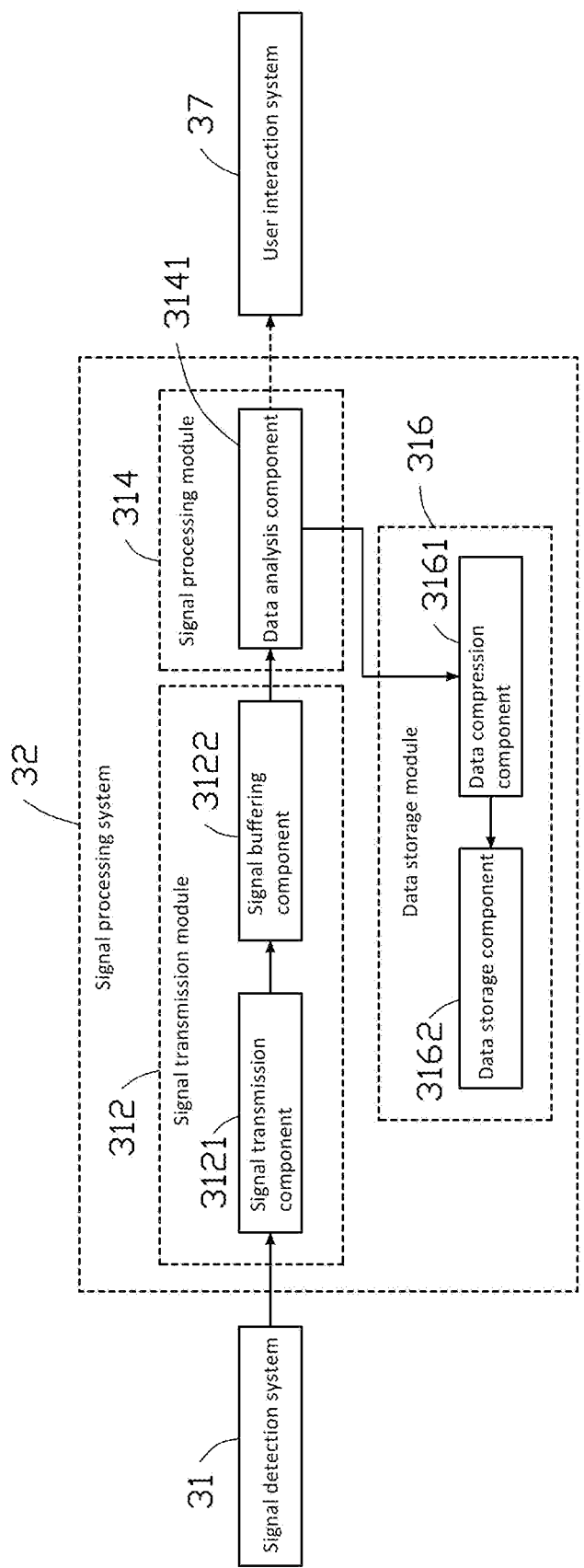
FIG. 8 is a block diagram of a signal processing system of the gene sequencing system in FIG. 2.

FIG. 8 is a detailed diagrammatic view of an embodiment of the signal transmission module 312, the signal processing module 314, and the data storage module 316. The signal transmission module 312 includes components such as a signal transmission component 3121 and a signal buffering component 3122. The signal processing module 314 includes a data analysis component 3141. The data storage module 316 includes components such as a data compression component 3161 and a data storage component 3162.

The signal transmission component 3121 is used to collect and transmit the feedback signal obtained by the signal detection system 31. The signal transmission component 3121 can be a device, such as a data acquisition card, for regularly collecting voltage and current signals.

The signal buffering component 3122 is used to buffer the feedback signal before the feedback signal is processed. The feedback signal can wait for calling and processing after being opened in the buffer. The signal buffering component 3122 may be a computer memory or other levels of buffer.

The data analysis component 3141 is used to extract the feedback signal temporarily buffered in the signal buffering component 3122, and then performs operations of conversion and filtering, so that the feedback signal can be analyzed and the sequencing report is generated. The data analysis component 3141 can be the hardware used by the computer for processing, such as memory, CPU, GPU, and other hardware, which can cooperate with processing and analysis programs.

The data compression component 3161 is used to compress the processed data before storage, so that a storage space and a write storage time required can be reduced. The data compression component 3161 can be the hardware used by the computer for processing, such as memory, CPU, GPU, and other hardware, which can cooperate with the processing and analysis programs.

The data storage component 3162 is used to store the compressed data and the generated sequencing report, so as to save and backup the detection results. The data storage component 3162 can be any computer storage media, such as hard disk, flash disk, disk, and other hardware.

In FIG. 8, the solid line with arrow starts from the signal detection system 31, successively connects the signal transmission component 3121, the signal buffering component 3122, the data analysis component 3141, and the data compression component 3161, and finally reaches the data storage component 3162. This process represents from the beginning of the signal detection system 31 receiving the feedback signal of the sample, a path for transforming the feedback signal into data that can be used for analysis and obtaining and storing the detection results. In this process, for the detection of an electrical signal, the electrical signal such as a voltage and a current is gradually transformed into readable, writable, and analyzed digital data and stored. For the detection of an optical signal, a digital photo and other data are gradually transformed into readable, writable, and analyzed digital data and stored.

In FIG. 8, a long dotted line with arrow starts from the data analysis component 3141 and directly reaches the user interaction system 37. This process represents real-time feedback of the signal processing system 32 to the user when obtaining and processing data.

It can be understood that in other embodiments, the signal processing system 32 may only include the signal transmission component 3121. The signal transmission component 3121 collects the feedback signal obtained by the signal detection system 31, and transmits the feedback signal to a data processing device arranged outside the gene sequencer 1.

It can be understood that in other embodiments, the signal processing system 32 may not include the signal buffering component 3122 and the data analysis component 3141. After collecting the feedback signal obtained by the signal detection system 31, the signal transmission component 3121 transmits the feedback signal to the data compression component 3161. The data compression component 3161 compresses the feedback signal, and stores the compressed feedback signal in the data storage component 3162. Then, the data storage component 3162 can be removed from the gene sequencer 1 and further accessed by a data processing device arranged outside the gene sequencer 1 to generate a sequencing report.

It can be understood that in other embodiments, the signal processing system 32 may also not include the signal buffering component 3122, the data analysis component 3141, and the data storage component 3162. After collecting the feedback signal obtained by the signal detection system 31, the signal transmission component 3121 transmits the feedback signal to the data compression component 3161. The data compression component 3161 compresses the feedback signal, and transmits the compressed feedback signal to the data processing device arranged outside the gene sequencer 1.

Figure 9:
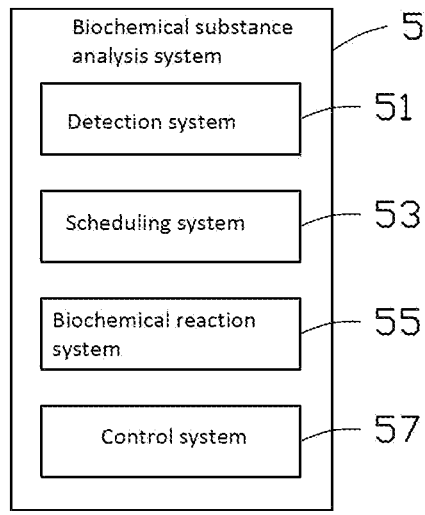
FIG. 9 is a block diagram of a biochemical substance analysis system according to a second embodiment of the present disclosure.

FIG. 9 is a diagrammatic view of a biochemical substance analysis system according to a second embodiment of the present disclosure. The biochemical substance analysis system 5 is used to receive the flow cell and complete the detection of the biological characteristics of the sample in the flow cell. The biological characteristics can be the gene sequence of the sample. The biochemical substance analysis system 5 includes a detection system 51, a scheduling system 53, a biochemical reaction system 55, and a control system 57. The scheduling system 53 is used to schedule the flow cell at different sites, and the sites include sites in the detection system 51 and sites in the biochemical reaction system 55. The biochemical reaction system 55 is used to allow the sample to react in the flow cell, for example, to inject a reaction substance into the flow cell that reacts with the sample in the flow cell. The detection system 51 is used to perform the signal detection on the reacted sample to obtain a signal representing the biological characteristics of the sample. The control system 57 is used to control the detection system 51, the scheduling system 53, and the biochemical reaction system 55 to cooperate with each other. Specifically, the detection system 51 may include the signal detection system 31 in the first embodiment, or include both the signal detection system 31 and the signal processing system 32 in the first embodiment. The signal representing the biological characteristics of the sample may be the feedback signal obtained by the signal detection system 31 or analyzable data obtained after the feedback signal is processed by the signal processing system 32. The scheduling system 53 may include the transfer system 35 in the first embodiment. The biochemical reaction system 55 may include the fluid system 33 in the first embodiment, or include both the fluid system 33 and the waste treatment system 34 in the first embodiment. The control system 57 may include the control system 36 in the first embodiment.

Figure 10:
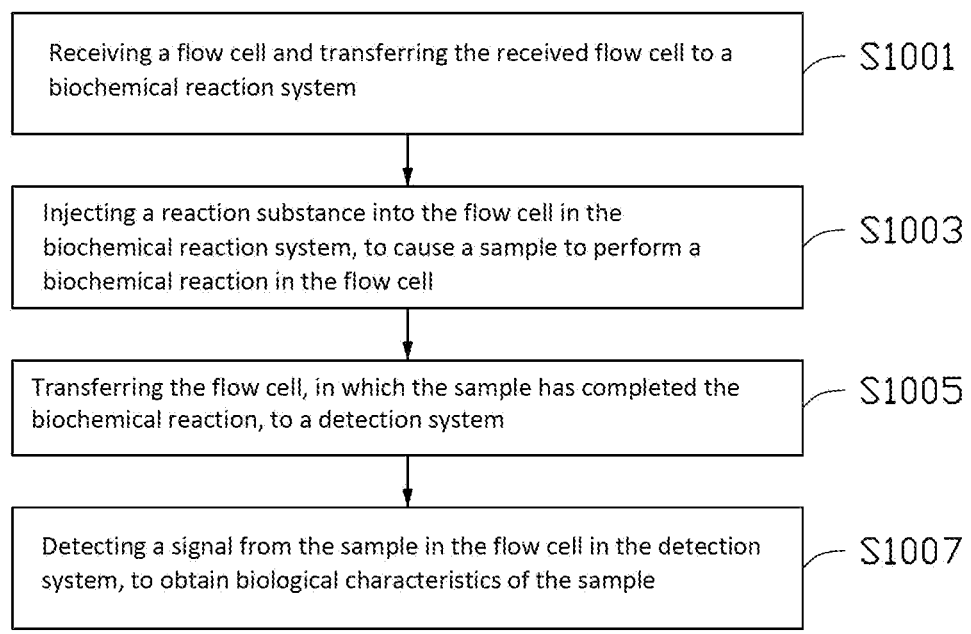
FIG. 10 is a flowchart of a biochemical substance analysis method according to a third embodiment of the present disclosure.

FIG. 10 is a flowchart of a biochemical substance analysis method according to a third embodiment of the present disclosure. The biochemical substance analysis method includes following steps.

Step S1001, receiving the flow cell and transferring the received flow cell to the biochemical reaction system.

Step S1003, injecting the reaction substance into the flow cell in the biochemical reaction system, to cause the sample to perform the biochemical reaction in the flow cell.

Step S1005, transferring the flow cell, in which the sample has completed the biochemical reaction, to the detection system.

Step S1007, detecting a signal from the sample in the flow cell in the detection system, to obtain the biological characteristics of the sample.

Furthermore, in other embodiments, before transferring the flow cell to the biochemical reaction system, the biochemical substance analysis method may also include judging whether the sites in the biochemical reaction system used for loading the flow cell are idle. When one or more sites are idle, loading the flow cell to one of the idle sites. When the sites are not idle, placing the flow cell in a flow cell temporary storage position.

Furthermore, in other embodiments, before transferring the flow cell to the detection system, the biochemical substance analysis method may also include judging whether the sites in the detection system used for loading the flow cell are idle. When one or more sites are idle, loading the flow cell to one of the idle sites. When the sites are not idle, placing the flow cell in the flow cell temporary storage position.

Furthermore, in other embodiments, before receiving the flow cell, the biochemical substance analysis method also includes detecting whether there is a flow cell at the site for the receiving flow cell, and receiving the flow cell when there is a flow cell at the site for receiving the flow cell.

Furthermore, in other embodiments, after the detection is completed, the biochemical substance analysis method also includes transferring the flow cell that has completed the detection to the biochemical reaction system again, which then repeats the whole process of reaction, transfer, and detection.

Furthermore, in other embodiments, after the detection is completed, the biochemical substance analysis method also includes transferring the flow cell after the detection to the flow cell abandonment position for receiving the waste flow cell.

Furthermore, in other embodiments, the step S1003 further includes absorbing the fluid from the storage module for storing the fluid and temporarily storing it in the sample storage component, and driving the fluid temporarily stored in the sample storage component into the flow cell to cause the sample in the flow cell to perform the reaction.

Furthermore, in other embodiments, the step S1003 further includes after temporarily storing the fluid in the sample storage component, determining whether the channel for the fluid to enter the flow cell is occupied. If the channel is occupied, temporarily storing the fluid in the sample storage component. If the channel is not occupied, driving the temporarily stored fluid into the flow cell through the channel.

Furthermore, in other embodiments, performing the reaction further includes when driving a first fluid from the sample storage component for storing the first fluid into the flow cell, also absorbing a second fluid from the storage module for storing the second fluid and temporarily storing it in the sample storage component for temporarily storing the second fluid.

Further, in other embodiments, the detection may further include processing the signal to obtain analyzable data or a detection report.

Figure 11:
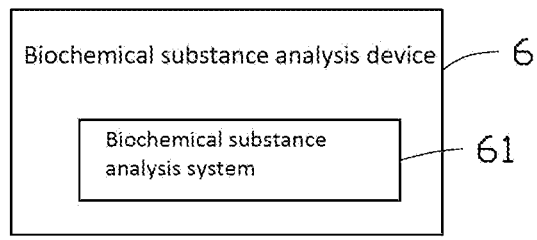
FIG. 11 is a diagrammatic view of a biochemical substance analysis device according to a fourth embodiment of the present disclosure.

FIG. 11 is a diagrammatic view of a biochemical substance analysis device including a biochemical substance analysis system according to a fourth embodiment of the present disclosure. The biochemical substance analysis device 6 includes at least one biochemical substance analysis system 61, which may be the biochemical substance analysis system 5 of the second embodiment.

Figure 12:
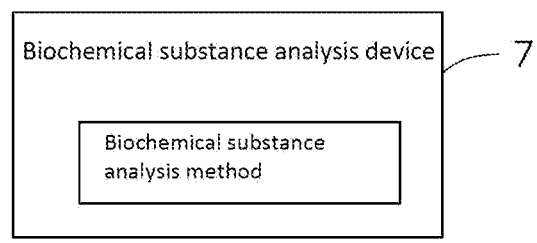
FIG. 12 is a diagrammatic view of a biochemical substance analysis device according to a fifth embodiment of the present disclosure.

FIG. 12 is a diagrammatic view of a biochemical substance analysis device applying the biochemical substance analysis method according to a fifth embodiment of the present disclosure. The biochemical substance analysis device 7 performs the biochemical substance analysis method of the third embodiment to obtain the signal reflecting the biological characteristics of the sample in the flow cell, analyzable data, or the detection report.

As mentioned above, using the gene sequencing system, the biochemical substance analysis system, method, and the device applying the biochemical substance analysis system or method provided by the embodiment of the disclosure, the user only needs to load the detection fluid, the cleaning fluid, and the flow cell containing the sample required for sequencing into the gene sequencer through the interface on the gene sequencer, and set relevant parameters through the user interaction system. Then, the gene sequencer and the gene sequencing system can automatically complete the process of gene sequencing.

The gene sequencer and the gene sequencing system provided by the embodiment of the present disclosure can simultaneously detect multiple flow cells by including multiple signal detection systems and/or multiple fluid systems, which improves the detection flux of the gene sequencer and the gene sequencing system.

The gene sequencer and the gene sequencing system provided by the embodiment of the present disclosure can be provided with multiple fluid transport working groups. Each fluid transport working group includes a sample storage component. When one fluid transport working group injects the fluid into the detection reaction module and the flow cell, other fluid transport working groups can use this time gap to absorb the fluid for preparation. Thus, a preparation time before injection the fluid into the flow cell is saved, and the detection flux of the gene sequencer and the gene sequencing system is also improved.

Even though information and advantages of the embodiments have been set forth in the foregoing description, together with details of the structures and functions of the embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A biochemical substance analysis system configured for detecting biological characteristics of a sample in a flow cell, comprising:
   a detection system;
   a scheduling system;
   a biochemical reaction system; and
   a control system,
   wherein the scheduling system is configured to schedule the flow cell at different sites, the sites comprise sites in the detection system and sites in the biochemical reaction system; the biochemical reaction system is configured to allow the sample to perform a reaction in the flow cell; the detection system is configured to detect a signal from the reacted sample to obtain the biological characteristics of the sample; the control system is configured to control the detection system, the scheduling system, and the biochemical reaction system to cooperate with each other;
   wherein the biochemical reaction system comprises a fluid system, the fluid system is configured to load a fluid to the flow cell, thereby causing the fluid to react with the sample in the flow cell;
   wherein the fluid system comprises a detection reaction module, a fluid transport module, and a storage module for storing the fluid; the detection reaction module is configured to detachably mount the flow cell thereon; the fluid transport module is configured to inject the fluid stored in the storage module into the flow cell.

2. The biochemical substance analysis system of claim 1, wherein the scheduling system comprises a transfer system, and the transfer system is configured to move the flow cell to the different sites.

3. The biochemical substance analysis system of claim 1, wherein the biochemical reaction system further comprises a waste treatment system, and the waste treatment system is configured to collect waste discharged by the fluid system.

4. The biochemical substance analysis system of claim 3, wherein the waste treatment system comprises a waste collection module; the waste collection module comprises a waste collection power component and a waste storage component; the waste collection power component is configured to provide power for driving the waste that lacks flowing power; the waste storage component is configured to store the collected waste.

5. The biochemical substance analysis system of claim 4, wherein the waste treatment system further comprises a waste transport module; the waste transport module comprises a waste-discharged power component and a waste switching component; the waste switching component is a pipeline switching component configured to connect to a pipeline out of a gene sequencing system; the waste-discharged power component is configured to provide power for discharging the waste from the waste storage component.

6. The biochemical substance analysis system of claim 4, wherein the waste collection module also comprises a waste detection component, and the waste detection component is configured to detect an amount of the waste stored in the waste storage component; when the waste detection component detects that the amount of the waste in the waste storage component exceeds a preset threshold, the control system controls the waste-discharged power component to discharge the waste.

7. The biochemical substance analysis system of claim 1, wherein the detection system comprises a signal detection system, the signal detection system is configured to detect the signal from the reacted sample to obtain a feedback signal from the sample, and the feedback signal represents the biological characteristics of the sample; or, the detection system comprises a signal detection system and a signal processing system, the signal processing system is configured to collect the feedback signal, and the collected feedback signal is configured to generate a sequencing report.

8. The biochemical substance analysis system of claim 7, wherein the signal detection system comprises an excitation signal transmission module, a signal channeling module, a feedback signal receiving module, and a detection fixing component; the detection fixing component is configured to detachably mount and fix the flow cell thereon; the excitation signal transmission module is configured to apply an excitation signal to the sample in the flow cell; the feedback signal receiving module is configured to receive the feedback signal from the sample excited by the excitation signal; the signal channeling module is configured to guide the excitation signal transmitted by the excitation signal transmission module to the flow cell according to a preset path, and also guide the feedback signal from the flow cell to the feedback signal receiving module according to the preset path.

9. The biochemical substance analysis system of claim 8, wherein the signal detection system further comprises a moving component, and the moving component is configured to drive the detection fixing component to move within a certain range, to enable the signal from the sample at different positions of the flow cell to be detected.

10. The biochemical substance analysis system of claim 1, wherein the biochemical substance analysis system is placed in a gene sequencer, and the biochemical substance analysis system is configured to receive the flow cell containing the sample through a flow cell inletting interface arranged on the gene sequencer.

11. The biochemical substance analysis system of claim 1, wherein the fluid transport module comprises at least one fluid transport working group, the at least one fluid transport working group comprises a power component, a sample storage component, and a distribution component; the power component is configured to provide a pressure gradient for absorbing the fluid from the storage module, allowing the fluid to be temporarily stored in the sample storage component after passing through the distribution component; the power component is also configured to provide another pressure gradient for driving the fluid stored in the sample storage component to the flow cell through the distribution component.

12. The biochemical substance analysis system of claim 1, wherein the at least one fluid transport working group comprises a plurality of fluid transport working groups; the fluid system also comprises an overall distribution component, the plurality of fluid transport working groups are connected to the overall distribution component; the overall distribution component connects different one of the plurality of fluid transport working groups to the flow cell.

13. The biochemical substance analysis system of claim 12, wherein when one of the plurality of fluid transport working groups injects the fluid into the flow cell through the overall distribution component, another one or more of the plurality of fluid transport working groups are configured to absorb the fluid from the storage module and stores the fluid in the sample storage component.

14. The biochemical substance analysis system of claim 1, wherein the detection reaction module comprises an inlet switch component, an outlet switch component, a bypass switch component, and an overall switch component; the inlet switch component is connected between the fluid transport module and a flow cell inlet of the flow cell; the outlet switch component is connected to the bypass switch component, the overall switch component, and a flow cell outlet of the flow cell; the overall switch component is connected to the waste treatment system.

15. The biochemical substance analysis system of claim 14, wherein when the fluid transport module injects the fluid that will participate in a detection reaction into the detection reaction module, the fluid enters the flow cell through the inlet switch component and the flow cell inlet, and then enters the waste treatment system through the flow cell outlet, the outlet switch component, and the overall switch component; when the fluid transport module injects the fluid that will not participate in the detection reaction into the detection reaction module, the fluid flows into the waste treatment system through the bypass switch component and the overall switch component; when the fluid transport module injects the fluid for cleaning a sealing area between the detection reaction module and the flow cell inlet into the detection reaction module, the fluid enters the waste treatment system through the inlet switch component and the sealing area; and/or, when the fluid transport module injects the fluid for cleaning a sealing area between the detection reaction module and the flow cell outlet into the detection reaction module, the fluid enters the waste treatment system through the bypass switch component, the outlet switch component, and the sealing area.

16. A biochemical substance analysis device, comprising a biochemical substance analysis system, the biochemical substance analysis system comprising:
a detection system;
a scheduling system;
a biochemical reaction system; and
a control system,
wherein the scheduling system is configured to schedule a flow cell containing a sample at different sites, the sites comprise sites in the detection system and sites in the biochemical reaction system; the biochemical reaction system is configured to allow the sample to perform a reaction in the flow cell; the detection system is configured to detect a signal from the reacted sample to obtain biological characteristics of the sample; the control system is configured to control the detection system, the scheduling system, and the biochemical reaction system to cooperate with each other;
wherein the biochemical reaction system comprises a fluid system, the fluid system is configured to load a fluid to the flow cell, thereby causing the fluid to react with the sample in the flow cell;
wherein the fluid system comprises a detection reaction module, a fluid transport module, and a storage module for storing the fluid; the detection reaction module is configured to detachably mount the flow cell thereon; the fluid transport module is configured to inject the fluid in the storage module into the flow cell.

* * * * *